United States Patent
Shiina

(10) Patent No.: US 11,467,453 B2
(45) Date of Patent: Oct. 11, 2022

(54) DISPLAY DEVICE

(71) Applicant: Japan Display Inc., Tokyo (JP)

(72) Inventor: Hideki Shiina, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/381,327

(22) Filed: Jul. 21, 2021

(65) Prior Publication Data

US 2021/0349337 A1   Nov. 11, 2021

Related U.S. Application Data

(63) Continuation of application No. 17/068,972, filed on Oct. 13, 2020, now Pat. No. 11,099,438, which is a continuation of application No. PCT/JP2019/017168, filed on Apr. 23, 2019.

(30) Foreign Application Priority Data

Apr. 27, 2018   (JP) .............................. JP2018-086367

(51) Int. Cl.
*G02F 1/1345*   (2006.01)
*G02F 1/1362*   (2006.01)

(52) U.S. Cl.
CPC ...... *G02F 1/1345* (2013.01); *G02F 1/136286* (2013.01)

(58) Field of Classification Search
CPC ..................................................... G02F 1/1345
See application file for complete search history.

(56) References Cited

U.S. PATENT DOCUMENTS

| | | | |
|---|---|---|---|
| 2003/0063229 A1* | 4/2003 | Takahashi | G02F 1/136286 349/43 |
| 2006/0267914 A1* | 11/2006 | Chang | G02F 1/1345 345/100 |
| 2017/0219893 A1* | 8/2017 | Morita | G02F 1/1368 |
| 2017/0269440 A1* | 9/2017 | Yoshitomi | G06F 3/0446 |

\* cited by examiner

*Primary Examiner* — Sang V Nguyen
(74) *Attorney, Agent, or Firm* — Michael Best & Friedrich LLP

(57) ABSTRACT

A display portion of a display device includes a gate wiring formed of a first metal layer, a signal line formed of a second metal layer, a metal wiring formed of a third metal layer. A terminal portion of the display device includes a first metal portion formed of the second metal layer, and a second metal portion that is laminated on the first metal portion and formed of the third metal layer. The second metal portion covers an upper surface and a side surface of the first metal portion, and a peripheral portion of the second metal portion is covered by an organic insulating film, and the inside of the peripheral portion of the second metal portion is exposed via a first through hole formed in the organic insulating film.

10 Claims, 19 Drawing Sheets

F I G . 17
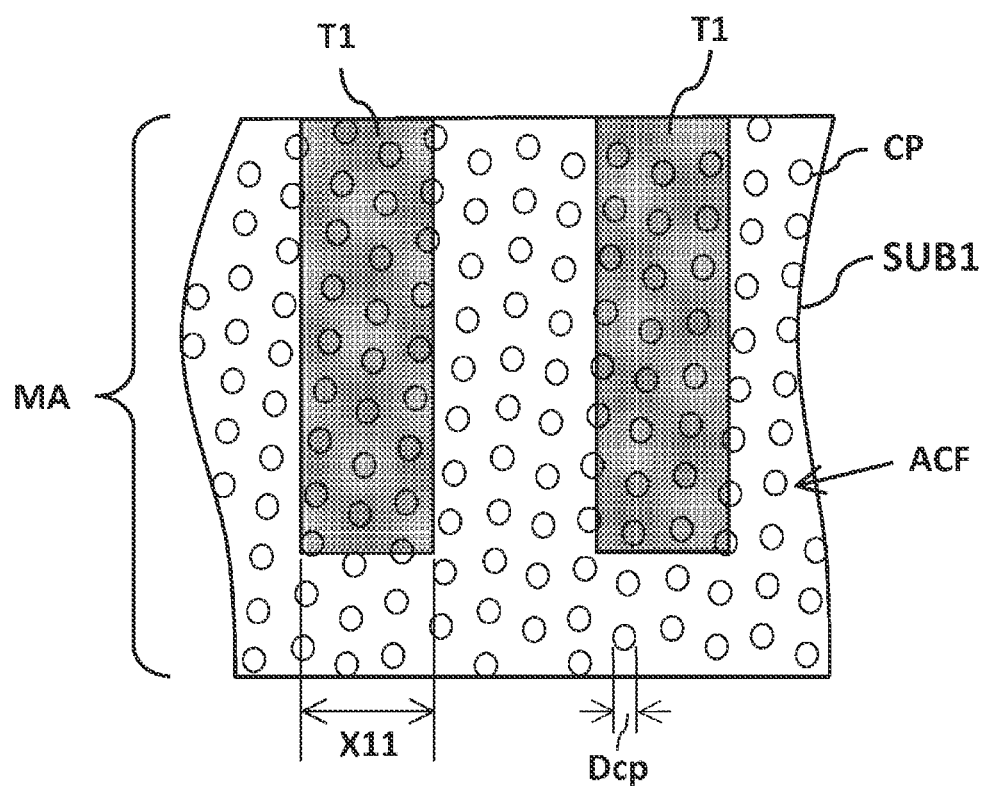

DISPLAY DEVICE

CROSS-REFERENCE TO RELATED APPLICATIONS

This application is a continuation of U.S. patent application Ser. No. 17/068,972 filed on Oct. 13, 2020, which, in turn, is a Bypass Continuation Application of PCT international Application No. PCT/JP2019/017168 filed on Apr. 23, 2019, which claims priority to Japanese Patent Application No. 2018-086367, filed on Apr. 27, 2018, the entire contents of which are incorporated herein by reference.

BACKGROUND OF THE INVENTION

The present invention relates to display devices, and particularly, the present invention can be applied to a display device including a terminal portion and an inspection pad for being connected to a flexible wiring substrate or a driver IC.

A display device using liquid crystal, organic electroluminescence, or the like is usually equipped with a terminal portion and an inspection pad, for example, at an edge of the substrate of the display panel of the display device. The terminal portion includes, for example, plural connection terminals such as a terminal to which video signals are provided, a terminal to which a clock signal is provided, and a terminal to which electric power is provided in order to display images on the display panel. The terminal portion of the display panel is connected to a flexible wiring substrate (also referred to as an FPC substrate or a flexible printed circuit substrate hereinafter) and a driver IC via an anisotropic conductive film (also referred to as an ACF film). For example, Japanese Unexamined Patent Application Publication No. 2017-151371 proposes the configurations of the respective terminals of a terminal portion.

SUMMARY OF THE INVENTION

In order to verify the reliability of a display device, the inventors of the present invention conducted a burn-in test of the display device in such a way that the display device is made to operate under a high temperature and high humidity environment by supplying electric power to the display device. AS a result of this verification, the inventors have found that there is a case where a terminal of the terminal portion of the display device, to which the electric power is supplied, is eroded owing to a certain configuration of the terminal portion.

An object of the present invention is to provide a display device that can be expected to improve the reliability of the terminal portion of the display device itself.

Problems other than the above and new features will be explicitly shown by the descriptions of this specification and the accompanying drawings.

The outline of a typical aspect of the present invention will be briefly explained as follows.

To put it concretely, a display device includes: a display panel having a display portion and a mounting unit, and a terminal portion in the mounting unit. The display portion includes: a gate wiring formed of a first metal layer; a signal line formed of a second metal layer; a metal wiring formed of a third metal layer; a first transparent electrode formed of a first transparent conductive film, and a second transparent electrode formed of a second transparent conductive film. The terminal portion includes: a first metal portion formed of the second metal layer; and a second metal portion that is laminated on the first metal portion and formed of the third metal layer. The second metal portion covers an upper surface and a side surface of the first metal portion, and a peripheral portion of the second metal portion is covered by an organic insulating film, and the inside of the peripheral portion of the second metal portion is exposed via a first through hole formed in the organic insulating film.

BRIEF DESCRIPTION OF THE DRAWINGS

FIG. 17 is an enlarged view conceptually showing the terminal portion T1 shown in FIG. 13 and conductive beads CP in an anisotropic conductive film ACF;

DETAILED DESCRIPTION OF THE PREFERRED EMBODIMENT

Hereinafter, an embodiment of the present invention will be explained with reference to the accompanying drawings.

Here, the following disclosure is only an example, and it goes without saying that various modifications that may be made accordingly by those skilled in the art without deviating from the gist of the present invention fall within the scope of the present invention. In addition, there are some cases where, in the accompanying drawings, the widths, thicknesses, shapes, and the like of respective portions of the embodiment are schematically depicted differently from what they really are, but these depictions are only examples, so that the interpretation of the present invention is not limited to these depictions.

Furthermore, in this specification and the accompanying drawings, the same components as components that have appeared in already-described drawings are given the same reference signs, and detailed explanations about them may be omitted accordingly.

In this embodiment, a liquid crystal display device is disclosed as an example of a display device. This liquid crystal device can be used for various kinds of devices such as a smart phone; a tablet terminal; a cellular phone terminal; a personal computer; a TV receiver; an in-vehicle device; a game machine; and the like. Here, the main configurations disclosed in this embodiment can be applied to a self-luminous type display device including organic electroluminescence display elements and the like; an electronic paper type display device including electrophoretic elements and the like; a display device using MEMS (Micro Electro Mechanical Systems); a display device using electrochromism; and the like.

Entire Configuration Example of Display Device

Figure 1:
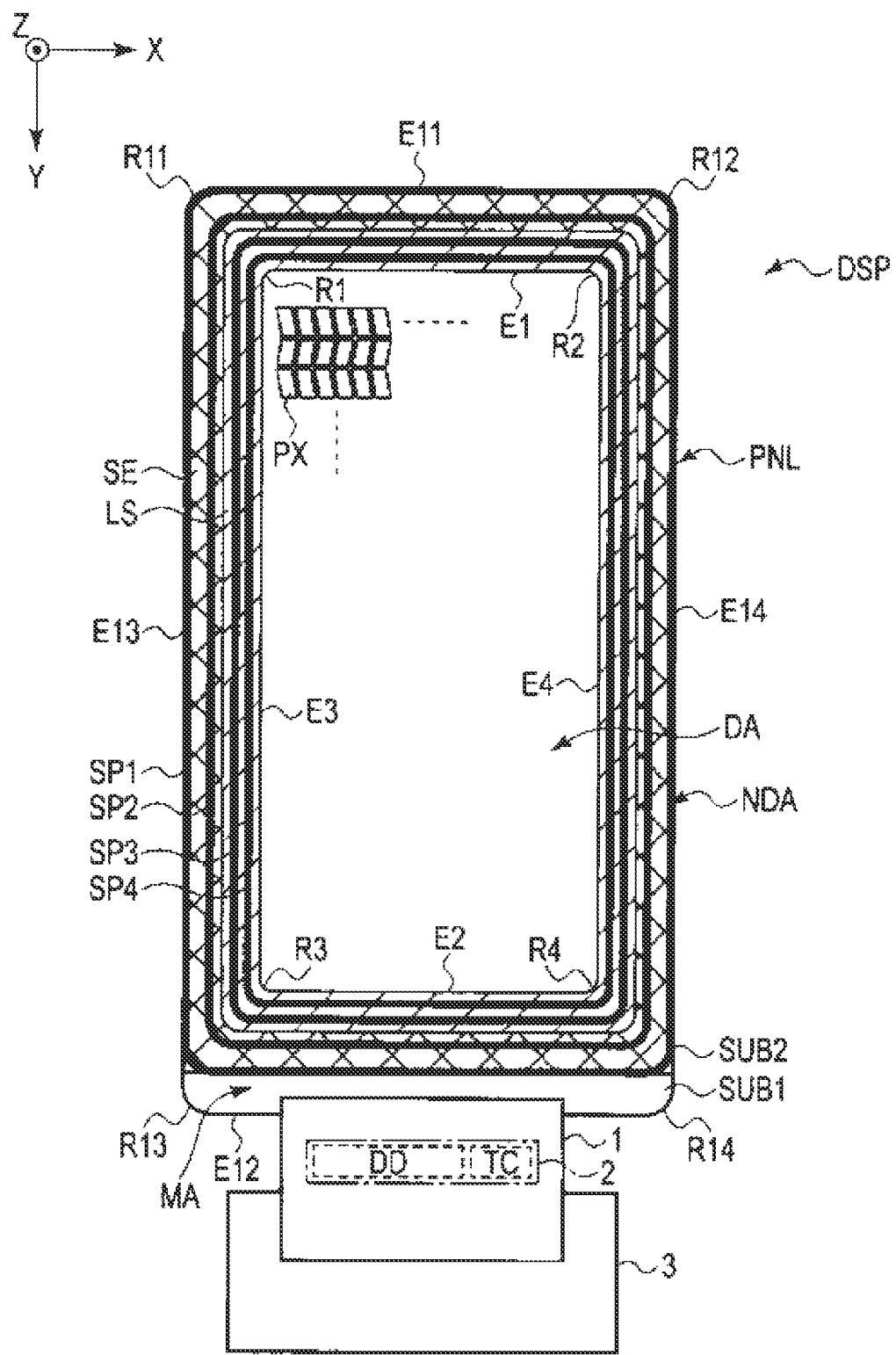
FIG. 1 is a plan view showing the exterior appearance of a display device DSP according to this embodiment.

FIG. 1 is a plan view showing the exterior appearance of a display device DSP according to this embodiment. Although a first direction X, a second direction Y, and a third direction Z are perpendicular to one another in this example, it is also conceivable that these directions intersect with one another at angles other than a right angle. The first direction X and the second direction Y are corresponding to directions parallel with the main surface of a substrate included in the display device DSP respectively, and the third direction Z is corresponding to a direction of the thickness of the display device DSP. In this specification, a direction from the origin of the XYZ coordinates to the tip of an arrow showing the third direction Z is referred to as an upward direction (or an up direction for simplicity) and a direction from the tip of the arrow to the origin of the XYZ coordinates is referred to as a downward direction (or a down direction for simplicity). In addition, it will be assumed that there is an observation point for observing the display device DSP to the tip side of the arrow showing the third direction Z, and viewing an object from this observation point to an XY plane defined by the first direction X and the second direction Y is referred to as viewing the object in a planar view.

In FIG. 1, the plan view of the display device DSP on the XY plane is shown. The display device DSP includes: a display panel PNL; a flexible printed circuit substrate (flexible wiring substrate) 1; an IC chip 2; and a circuit substrate 3.

The display panel PNL is a liquid crystal display panel and includes: a first substrate SUB1; a second substrate SUB2; an after-mentioned liquid crystal layer LC; a seal SE; a light shielding layer LS; and spacers SP1 to SP4. Furthermore, the display panel PNL includes a display portion (display area) DA for displaying images and a frame shaped nondisplay portion (nondisplay area) NDA surrounding the display portion DA. The second substrate SUB2 faces the first substrate SUB1. The first substrate SUB1 includes a mounting unit MA extending further in the second direction Y than the second substrate SUB2.

The seal SE is located in the nondisplay portion NDA and bonds the first substrate SUB1 and the second substrate SUB2 together, and the seal SE seals the liquid crystal layer LC. The light shielding layer LS is located in the nondisplay portion NDA. The seal SE is formed at an area where the seal SE overlaps the light shielding layer LS in a planar view. In FIG. 1, an area where the seal SE is disposed and an area where the light shielding layer LS is disposed are illustrated by different kinds of hatched lines respectively, and an area where the seal SE and the light shielding layer LS overlap each other is illustrated by cross-hatching. The light shielding layer LS is formed on the second substrate SUB2.

Each of the spacers SP1 to SP4 is located in the nondisplay portion NDA. The spacer SP1 is located in the outermost peripheral of the display panel PNL. The spacer SP2 is located nearer to the display portion DA than the spacer SP1. The spacer SP1 and the spacer SP2 overlap the seal SE. The spacer SP3 and the spacer SP4 are located nearer to the display portion DA than the seal SE. The spacers SP1 to SP4 are formed on the second substrate SUB2 in this case, but it is conceivable that the spacers SP1 to SP4 are formed on the first substrate SUB1.

The display portion DA is disposed inside an area surrounded by the light shielding layer LS. The display portion DA includes plural pixels disposed in a matrix shape in the first direction X and in the second direction Y. The display portion DA includes: a pair of sides E1 and E2 extending in the first direction X; a pair of sides E3 and E4 extending in the second direction Y; and four round portions R1 to R4. The display panel PNL includes: a pair of sides E11 and E12 extending in the first direction X; a pair of sides E13 and E14 extending in the second direction Y; and four round portions R11 to R14. The round portions R11 to R14 are located outside the round portions R1 to R4 respectively. The curvature radius of the round portion R11 can be equal to that of the round portion R1 or can be different from that of the round portion R1.

The flexible printed circuit substrate 1 is mounted on the mounting unit MA and connected to the circuit substrate 3. IC chip 2 is mounted on the flexible printed circuit substrate 1. Here, it is also conceivable that the IC chip 2 is mounted on the mounting unit MA. The IC chip 2 embeds a display driver DD that outputs signals necessary for image display in a display mode in which images are displayed. In addition, in the example shown in FIG. 1, the IC chip 2 embeds a touch controller TC for controlling a touch-sensing mode in which an object approaching or touching the display device DSP is detected. In FIG. 1, the IC chip 2 is depicted by alternate long and short dashed lines, and the display driver DD and the touch controller TC are depicted by dotted lines.

The display panel PNL according to this embodiment can be any of a transmissive type panel having a transmissive display function that displays images by selectively transmitting light emitted from the rear side of the first substrate SUB1, a reflective type panel having a reflective display function that displays images by selectively reflecting light emitted from the front side of the second substrate SUB2, and a semi-transmissive type panel having both transmissive display function and reflective display function.

In addition, although the detailed configuration of the display pane PNL is not explained here, it is conceivable that the display panel PNL includes a configuration compatible with any of a display mode using a lateral electric field along a main substrate surface, a display mode using a longitudinal electric field along the normal line of the main substrate surface, a display mode using an oblique electric field that is oblique to the main substrate surface, and a display mode using an adequate combination of the abovementioned lateral, longitudinal, and oblique electric fields. Here, the main substrate surface is a surface parallel with the XY plan defined by the first direction X and the second direction Y.

Figure 2:
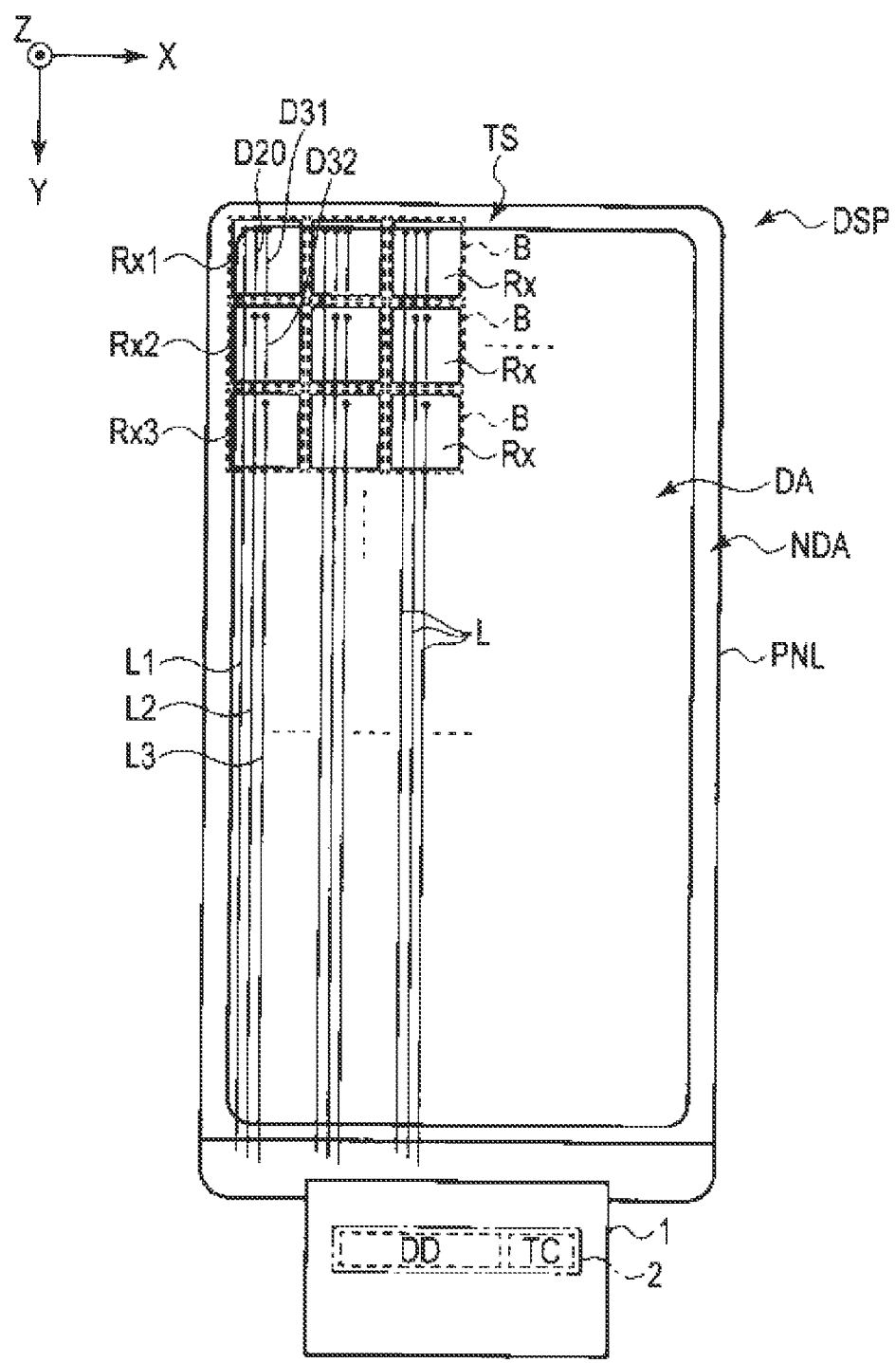
FIG. 2 is a plan view showing a configuration example of a touch sensor TS.

FIG. 2 is a plan view showing a configuration example of a touch sensor TS. Although the touch sensor TS will be explained as a self-capacity type touch sensor hereinafter, the touch sensor TS can be a mutual capacity type touch sensor. The touch sensor TS includes plural sensor electrodes Rx (Rx1, Rx2, . . . ) and plural sensor wirings L (L1, L2, . . . ). The plural sensor electrodes Rx are located in the display portion DA, and disposed in a matrix shape in the first direction X and in the second direction Y. One sensor electrode Rx composes one sensor block B. The sensor block B is a minimum unit capable of conducting touch sensing. The plural sensor wirings L are extending in the second direction Y respectively and arranged in parallel with one another in the first direction X in the display portion DA. Each of the sensor wirings L is formed at a position where each of the sensor wirings overlap one of later-mentioned signal lines S. Furthermore, each of the sensor wirings L is pulled out to the nondisplay portion NDA and electrically connected to the IC chip 2 via the flexible printed circuit substrate 1.

Here, attention is given to the relation among the sensor wirings L1 to L3 that are arranged in parallel with one another in the first direction X and the sensor electrodes Rx1 to Rx3 that are arranged in parallel with one another in the second direction Y. The sensor wiring L1 overlaps the sensor electrodes Rx1 to Rx3 and is electrically connected to the sensor electrode Rx1.

The sensor wiring L2 overlaps the sensor electrodes Rx2 and Rx3 and is electrically connected to the sensor electrode Rx2. A dummy wiring D20 is spaced from the sensor wiring L2. The dummy wiring D20 overlaps the sensor electrode Rx1 and is electrically connected to the sensor electrode Rx1. The sensor wiring L2 and the dummy wiring D20 are located on the same signal line.

The sensor wiring L3 overlaps the sensor electrode Rx3 and is electrically connected to the sensor electrode Rx3. A dummy wiring D31 overlaps the sensor electrode Rx1 and is electrically connected to the sensor electrode Rx1. A dummy wiring D32 is spaced from the dummy wiring D31 and the sensor wiring L3. The dummy wiring D32 overlaps the sensor electrode Rx2 and is electrically connected to the sensor electrode Rx2. The sensor wiring L3, the dummy wirings D31 and D32 are located on the same signal line.

In the touch sensing mode, the touch controller TC applies tough drive voltages to the sensor wirings L. With this, the touch drive voltages are applied to the sensor electrodes Rx, and sensing is conducted using the sensor electrodes Rx. Sensor signals corresponding to sensing results obtained by using the sensor electrodes Rx are output to the touch controller TC via the sensor wirings L. The touch controller TC or an external host processor detects whether or not there is an object that approaches or touches the display device DSP and the coordinates of the location of the object on the basis of the sensor signals.

In addition, in a display mode, sensor electrodes Rx function as common electrodes CE to which common voltages Vcom are applied. The common voltages are supplied, for example, from a voltage supply unit included in the display driver DD via the sensor wirings L.

Configuration Example of Pixel

Figure 3:
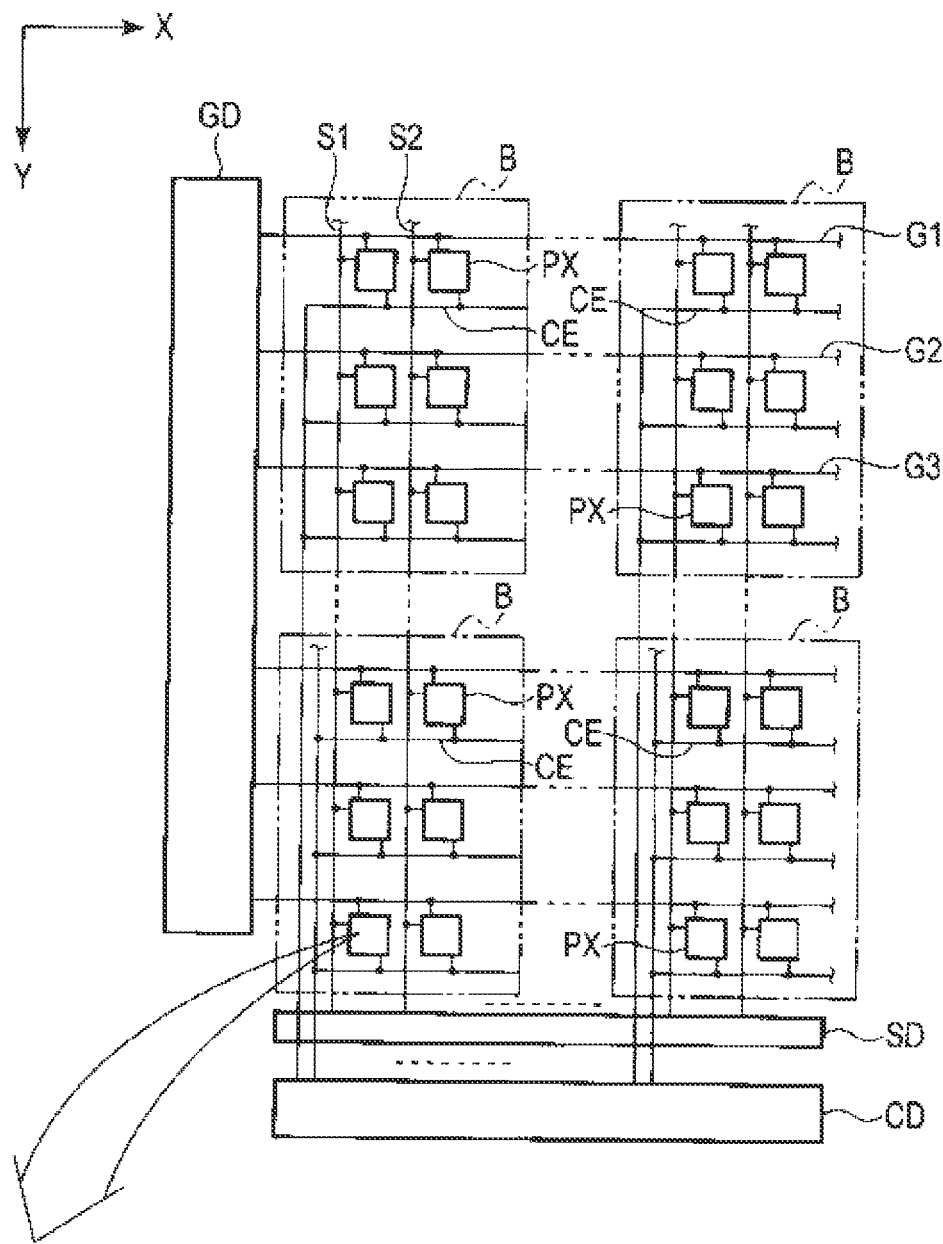
FIG. 3 is a diagram showing a fundamental configuration and an equivalent circuit of a pixel PX.
Figure 3:
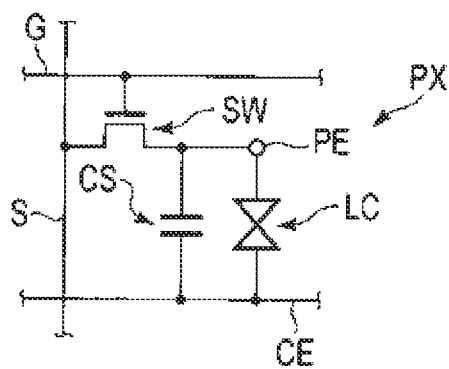

FIG. 3 is a diagram showing the basic configuration and an equivalent circuit of a pixel PX. Plural scanning lines (scanning signal lines) G1, G2, . . . are connected to a scanning line drive circuit GD. Plural signal lines (video signal lines) S1, S2, . . . are connected to a signal line drive circuit SD. Here, it is not always necessary that the scanning lines G and the signal lines S are linearly extending, and it is all right if parts of these lines are bent. For example, even if parts of the signal lines S are bent, it will be assumed that the signal lines S are extending in the second direction Y.

The one common electrode CE is connected to the voltage supply unit CD that supplies the common voltages Vcom, and the one common electrode CE is disposed for plural pixels PX. Furthermore, each of the common electrodes CE is also connected to the touch controller TC and functions as a sensor electrode RX. For example, 60 to 70 main pixels are disposed along the first direction X and 60 to 70 main pixels are disposed along the second direction Y in one sensor block B. Here, one pixel PX is a minimum unit that can be controlled in accordance with pixel signals and sometimes referred to as a subpixel. In addition, there are some cases where a minimum unit for realizing color display is referred to as a main pixel. A main pixel is composed of plural subpixels PX that respectively display different colors. As an example, a main pixel includes a red pixel for displaying red color, a green pixel for displaying green color, and a blue pixel for displaying blue color. Furthermore, it is also conceivable that the main pixel further incudes a white pixel for displaying white color.

Each pixel PX includes: a switching element SW; a pixel electrode PE; a common electrode CE; a liquid crystal layer LC; and the like. The switching element SW is composed of, for example, a thin film transistor (TFT) and electrically connected to a scanning line G and a signal line S. The scanning line G is connected to the switching element SW of each of pixels PX arranged in parallel with one another in the first direction X. The signal line S is connected to the switching element SW of each of pixels arranged in parallel with one another in the second direction Y. The pixel electrode PE is electrically connected to the switching element SW. The pixel electrode PE faces the common electrode CE, and the liquid crystal layer LC is driven by an electric field induced between the pixel electrode PE and the common electrode CE. A retention capacitor CS is formed, for example, between an electrode having the same potential as the common electrode CE and an electrode having the same potential as the pixel electrode PE.

Figure 4:
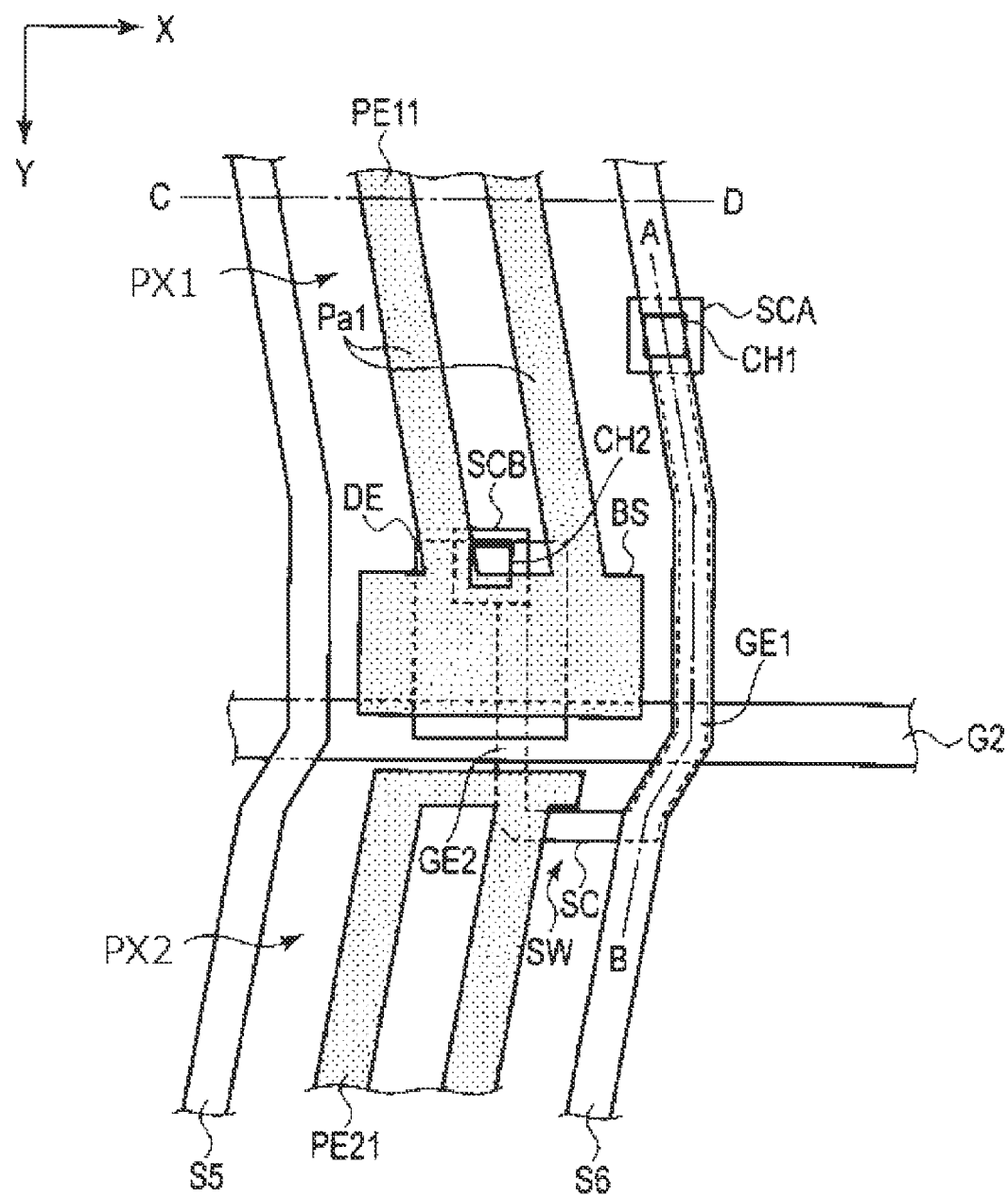
FIG. 4 is a plan view showing an example of a pixel layout.

FIG. 4 is a plan view showing an example of a pixel layout. The main portion of the pixel layout will be explained while attention is being paid to a pixel PX1 connected to a scanning line G2 and a signal line S6. In FIG. 4, a pixel PX2 is a pixel disposed under the pixel PX1, and a pixel electrode PE21 is the pixel electrode of the pixel PX2.

The switching element SW is electrically connected to the scanning line G2 and the signal line S6. The switching element SW shown as an example in FIG. 4 has a double gate structure. The switching element SW includes a semiconductor layer SC and a drain electrode DE. Here, in the switching element SW, there are some cases where the drain electrode DE is referred to as a source electrode. The semiconductor layer SC is disposed so that one part of the semiconductor layer SC overlaps the signal line S6 and the other part extends between the signal lines S5 and S6, and the semiconductor layer SC is formed in an approximate U shape as a whole. The semiconductor layer SC intersects with the scanning line G2 both in an area where the semiconductor layer SC overlaps the signal line S6 and in an area between a signal line S5 and the signal line S6. The above two areas where the scanning line G2 overlaps the semiconductor layer SC in the scanning line G2 function as gate electrodes GE1 and GE2 respectively. One edge SCA of the semiconductor layer SC is electrically connected to the signal line S6 via a contact hole CH1, and the other edge SCB of the semiconductor layer SC is electrically connected to the drain electrode DE via a contact hole CH2. The drain electrode DE is formed in an island shape and disposed between the single lines S5 and S6.

A pixel electrode PE11 includes plural charging poles Pa1 and one base BS. The base overlaps the drain electrode DE. In addition, the base is electrically connected to the electrode DE.

Configuration Example of Cross-Section of Display Device

Figure 5:
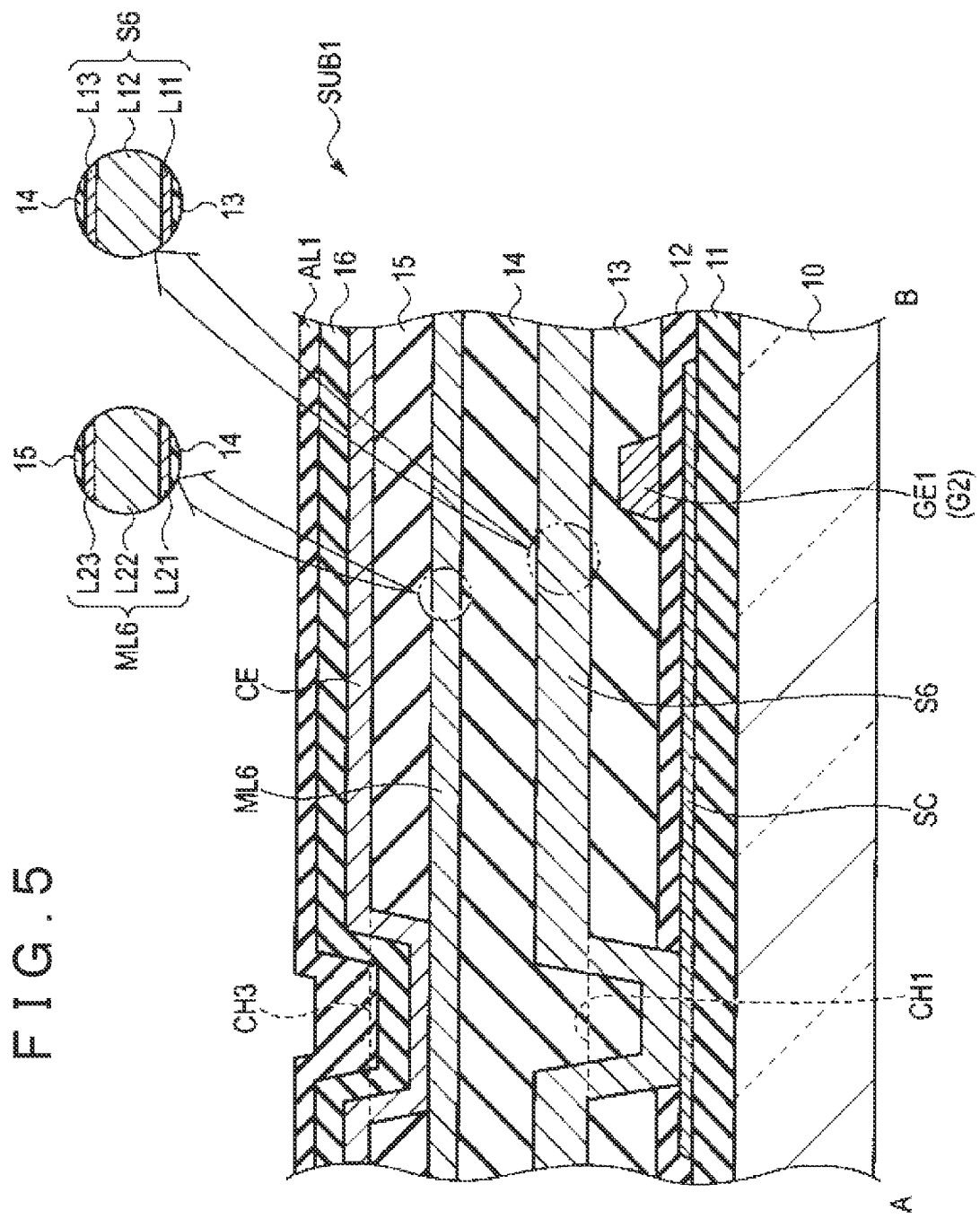
FIG. 5 is a cross-sectional view of a first substrate SUB1 taken along the line A-B shown in FIG. 4.

FIG. 5 is a cross-sectional view of the first substrate SUB1 taken along the line A-B shown in FIG. 4.

The first substrate SUB1 includes: an insulating substrate 10; insulating films 11 to 16; the semiconductor layer SC; the scanning line (first metal wiring) G2 formed of a first metal layer; the signal line (second metal wiring) S6 formed of a second metal layer; a metal wiring (third metal wiring) ML6 formed of a third metal layer; the common electrode (first transparent electrode) CE formed of a first transparent conductive film; the pixel electrode (second transparent electrode) PE; an orientation film AL1; and the like. Here, the pixel electrode (second transparent electrode) PE will be explained using after-mentioned FIG. 6.

The insulating substrate 10 is a light transmitting substrate such as a glass substrate or a flexible resin substrate. The insulating film 11 is located on the insulating substrate 10. The semiconductor layer SC is located on the insulating film 11 that is an undercoat film and covered by the insulating film 12 that is a gate insulating film. The semiconductor layer SC is formed of, for example, polycrystalline silicon, but it is also conceivable that the semiconductor layer SC is formed of amorphous silicon or oxide semiconductor.

The gate electrode GE1, which is a part of the scanning line G2, is located on the insulating film 12 and covered by the insulating film (inorganic insulating film) 13. Here, other not-shown scanning lines are also located in the same layer as the scanning line G2. It is conceivable that the scanning line G2 is formed of a metal material such as aluminum (Al); titanium (Ti); silver (Ag); molybdenum (Mo); tungsten (W); cupper (Cu); chromium (Cr) or an alloy formed of a combination of some of the these metal materials, and it is all right if the scanning line G2 has either a monolayer structure or a multilayer structure. As an example, the scanning line G2 is formed of a molybdenum-tungsten alloy.

The signal line S6 is located on the insulating film 13 and covered by the insulating film (first organic insulating film) 14. Here, another not-shown signal line S2 is located in the same layer as the signal line S6. It is conceivable that the signal line S6 is formed of any of the abovementioned metal materials or an alloy formed of a combination of some of the abovementioned metal materials, and it is all right if the signal line S6 has either a monolayer structure or a multilayer structure. As an example, the signal line S6 is a laminated body formed by laminating a first layer L11 including titanium (Ti), a second layer L12 including aluminum (Al), and a third layer L13 including titanium (Ti) in this order. The signal line S6 is in contact with the semiconductor layer SC via the contact hole CH1 penetrating the insulating films 12 and 13.

The metal wiring ML6 is located on the insulating film 14 and covered by the insulating film (second organic insulating film) 15. It is conceivable that the metal wiring ML16 is formed of any of the abovementioned metal materials or alloy formed of a combination of some of the abovementioned metal materials, and it is all right if the metal wiring ML6 has either a monolayer structure or a multilayer structure. As an example, the metal wiring ML6 is a laminated body formed by laminating a fourth layer L21 including molybdenum (Mo), a fifth layer L22 including aluminum (Al), and a sixth layer L23 including molybdenum (Mo) in this order. Here, it is also conceivable that the metal wiring ML6 is a laminated body formed by laminating the fourth layer L21 including titanium (Ti), the fifth layer L22 including aluminum (Al), and the sixth layer L23 including titanium (Ti) in this order.

The common electrode CE is located on the insulating film 15 and covered by the insulating film (inorganic insulating film) 16. The common electrode CE is a transparent electrode (transparent conductive film) formed of a transparent conductive material such as indium tin oxide (ITO) or indium zinc oxide (IZO). The common electrode CE is in contact with the metal wiring ML6 via the contact hole CH3 penetrating the insulating film 15. The orientation film AL1 is located on the insulating film 16.

It is conceivable that each of the insulating films 11 to 13 and the insulating film 16 is an inorganic insulating film formed of an inorganic insulating material such as silicon oxide, silicon nitride, or silicon nitride oxide, and it is all right if each of these insulating films has either a monolayer structure or a multilayer structure. The insulating films 14 and 15 are organic insulating films formed of, for example, an organic insulating material such as acrylate resin. Here, the insulating film 15 can be an inorganic insulating film.

As mentioned above, the common electrode CE functions as a sensor electrode Rx, and the metal wiring ML6 functions as a sensor wiring L electrically connected to the sensor electrode Rx.

Figure 6:
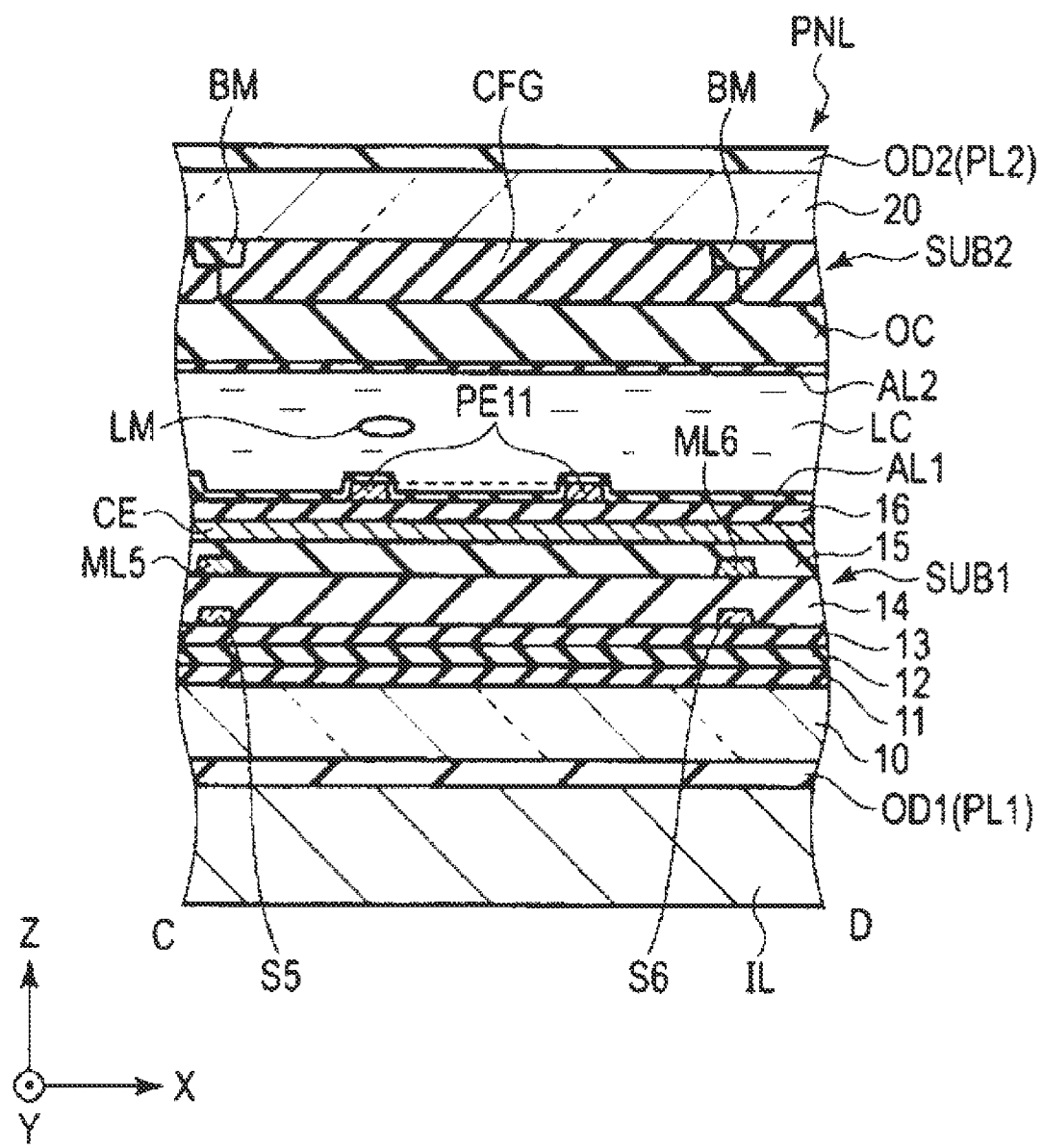
FIG. 6 is a cross-sectional view of a display panel PNL taken along the line C-D shown in FIG. 4.

FIG. 6 is a cross-sectional view of the display panel PNL taken along the line C-D shown in FIG. 4. The example shown in FIG. 6 is corresponding to an example to which an FFS (Fringe Field Switching) mode, one of modes using lateral electric fields, is applied.

In the first substrate SUB1, the signal lines S5 and S6 are located on the insulating film 13 and covered by the insulating film 14. A metal wiring ML5 and the metal wiring ML6 are located just above the signal lines S5 and S6 respectively. The pixel electrode PE11 is located on the insulating film 16 and covered by the orientation film AL1. The pixel electrode PE11 is a transparent electrode (transparent conductive film) formed of a transparent conductive material such as ITO or IZO.

The second substrate SUB2 includes: an insulating substrate 20; light shielding layers BM; a color filter CFG; an overcoat layer OC; an orientation film AL2, and the like.

The insulating substrate 20 is a light transmitting substrate such as a glass substrate or a flexible resin substrate as is the case with the insulating substrate 10. The light shielding layers BM and the color filter CFG are located at the side of the insulating substrate 20 facing the first substrate SUB1. The color filter CFG is disposed at a position facing the pixel electrode (second transparent electrode) PE11 and a part of the color filter CFG overlaps the light shielding layers BM. The overcoat layer OC covers the color filter CFG. The overcoat layer OC is formed of transparent resin. Other color filters CFR and CDB are also located at positions facing the pixel electrodes PE respectively, and these color filters are covered by the overcoat layer OC as is the case with the color filter CFG. The orientation film AL2 covers the overcoat layer OC. The orientation films AL1 and AL2 are formed, for example, of materials each of which has a horizontal orientation property.

The abovementioned first substrates SUB1 and second SUB2 are disposed so that the orientation film AL1 and the orientation film AL2 face each other. Although not shown in FIG. 6, a main spacer and a sub-spacer are disposed between the first substrate SUB1 and the second substrate SUB 2. The main spacer forms a predefined cell gap between the orientation film AL1 and the orientation film AL2. The size of the cell gap is, for example, 2 to 5 μm. The first substrate SUB1 and the second substrate SUB2 are bonded together by a seal member under the condition that the predefined cell gap is formed.

The liquid crystal layer LC is located between the first substrate SUB1 and the second substrate SUB2 and held between the orientation film AL1 and the orientation film AL2. The liquid crystal layer LC includes liquid crystal molecules LM. The liquid crystal layer LC is formed of a positive type liquid crystal material the dielectric anisotropy of which is positive or a negative type liquid crystal material the dielectric anisotropy of which is negative.

An optical element OD1 including a polarizing plate PL1 is bonded to the insulating substrate 10. An optical element OD2 including a polarizing plate PL2 is bonded to the insulating substrate 20. Here, it is conceivable that each of the optical element OD1 and the optical element OD2 includes a phase difference plate, a dispersion layer, and an antireflection layer as needed.

In such a display panel, in an off-state where any electric field is not formed between the pixel electrode PE and the common electrode CE, the liquid crystal molecules LM are initially oriented in a predefined direction between the orientation film AL1 and the orientation film AL2. In such an off-state, light irradiated from an illumination device IL to the display panel PNL is absorbed by the optical elements OD1 and OD2, so that a dark display appears. On the other hand, in an on-state where an electric field is formed between the pixel electrode PE and the common electrode CE, the liquid crystal molecules LM are oriented in a direction different from the initial orientation direction, and this orientation direction is controlled by the electric field. In such an on-state, a part of light irradiated from the illumination device IL penetrates the optical elements OD1 d OD2, so that a bright display appears.

Configuration Example of Mounting Unit

Figure 7:
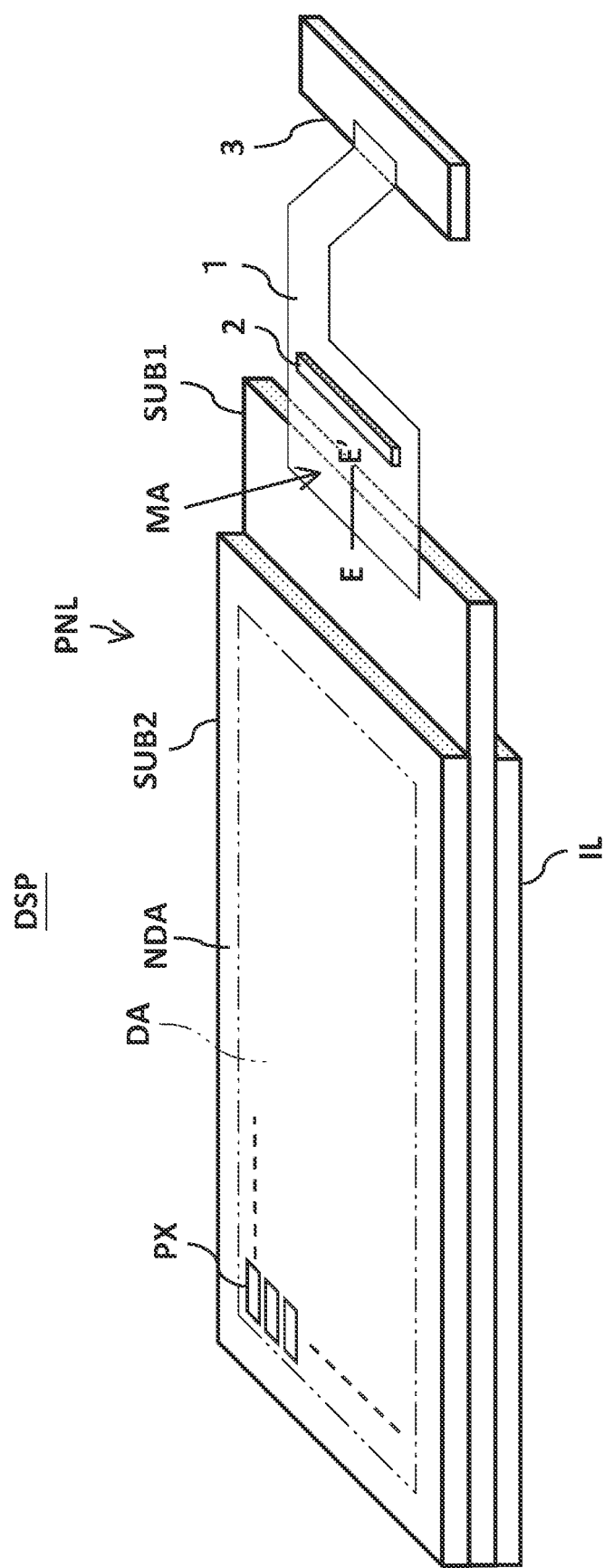
FIG. 7 is a perspective view schematically showing the display device DSP shown in FIG. 1.
Figure 8:
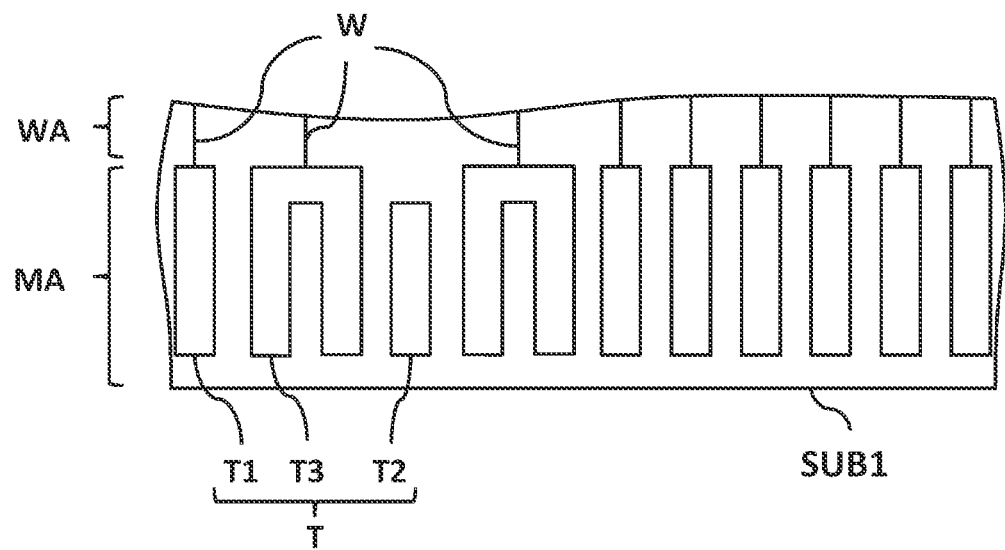
FIG. 8 is a plan view showing a configuration example of a mounting unit on the first substrate SUB1.
Figure 9:
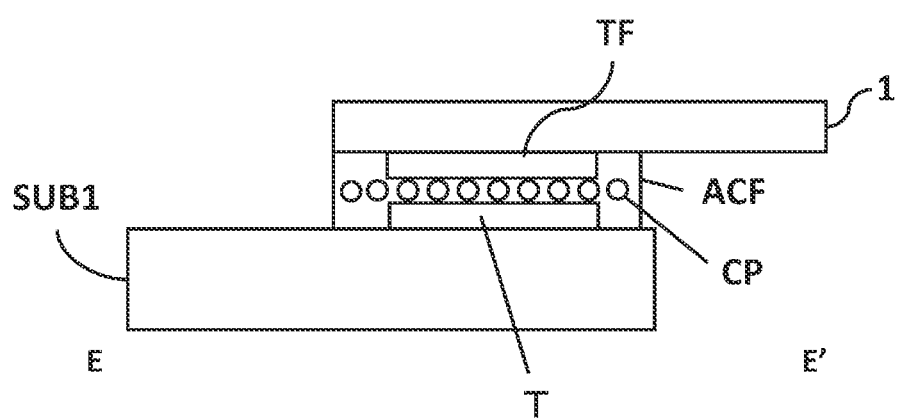
FIG. 9 is a cross-sectional view of the mounting unit MA and a flexible printed circuit substrate 1 taken along the line E-E' shown in FIG. 7.

FIG. 7 is a perspective view schematically showing the display device DSP shown in FIG. 1. FIG. 8 is a plan view showing a configuration example of the mounting unit on the first substrate SUB1. FIG. 9 is a cross-sectional view of the mounting unit MA and the flexible printed circuit substrate 1 taken along the line E-E' shown in FIG. 7.

As shown in FIG. 7, the display device DSP includes the display panel PNL, the flexible printed circuit substrate (flexible wiring substrate) 1. As shown in FIG. 1, the display panel PNL includes the first substrate SUB1, the second substrate SUB2, the display portion DA, and the nondisplay portion NDA. The illumination device IL, which functions as, for example, a backlight device, is provided at the underside of the first substrate SUB1. The first substrate SUB1 includes the mounting unit MA.

The mounting unit MA includes plural terminal portions T disposed so as to be arranged in parallel with one another as illustratively shown in FIG. 8. A wiring area WA formed adjacently to the mounting unit MA includes wiring portions W connected to the plural terminal portions T. The plural terminal portions T includes rectangle-shaped terminal portions T1 and T2 and an approximately U-shaped terminal portion T3. The plural terminal portions include: a terminal to which video signals are supplied; a terminal to which clock signals are supplied; a terminal to which electric power is supplied; terminals for inputting/outputting touch drive voltages and sensing results; and the like. The rectangle-shaped terminal portion T1 can be used as the terminal to which video signals are supplied; the terminal to which clock signals are supplied; the terminals for inputting/outputting touch drive voltages and sensing results; or the like, and a large number of terminal portions T1 can be formed in the mounting unit MA. The approximately U-shaped terminal portion T3 can be used as the terminal to which electric power is supplied, and in this case the impedance of the relevant electric power supply can be made low. The terminal portion T2 is a terminal portion to which no wiring portion W is connected, that is, a terminal portion the potential of which is electrically floating.

The plural terminal portions T are connected to plural wiring terminals formed at one end of the flexible printed circuit substrate 1. The IC chip 2 is formed on the flexible printed circuit substrate 1, and the input/output signals of the IC chip 2 are received from or transmitted to the display panel PNL via the plural terminal portions T. Plural wiring terminals formed at the other end of the flexible printed circuit substrate 1 are connected to plural wiring terminals formed on the circuit substrate 3 and connected to, for example, the inputs/outputs of a host processor formed on the circuit substrate 3.

The connections between the plural terminal portions T and plural wiring terminals TF of the flexible printed circuit substrate 1 are established using an anisotropic conductive film ACF as shown in FIG. 9. The anisotropic conductive film ACF can also be considered to be an anisotropic conductive film or an anisotropic conductive material. The anisotropic conductive film ACF is made of thermosetting resin in which plural conductive particles CP (also referred to as plural conductive beads hereinafter) are mixed, and electric conductions between the terminal portions T and wiring terminals TF are obtained owing to the plural conductive particles CP. The structure of a conductive particle CP is a spherical body the diameter of which is 3 to 5 micrometers and that is formed by laminating a nickel layer, a gold-plated layer, and an outermost insulating layer from inside to outside. In order to form the connections between the terminal portions T and the wiring terminals TF, the anisotropic conductive film ACF is sandwiched between the terminal portions T and the wiring terminals TF and the insulating layers of some conductive particles CP are broken using thermocompression or the like. As a result, electrically conductive paths between the terminal portions T and the wiring terminals TF are formed by the nickel layers and gold-plated layers of the above conductive particles CP. Because conductive particles CP in parts of the anisotropic conductive film ACF to which the thermocompression is not applied keep their insulating layers intact, insulations among the terminal portions T disposed in parallel with one another in the mounting unit MA are kept as they are.

Comparison Example: Configuration of Terminal Portion

Figure 10:
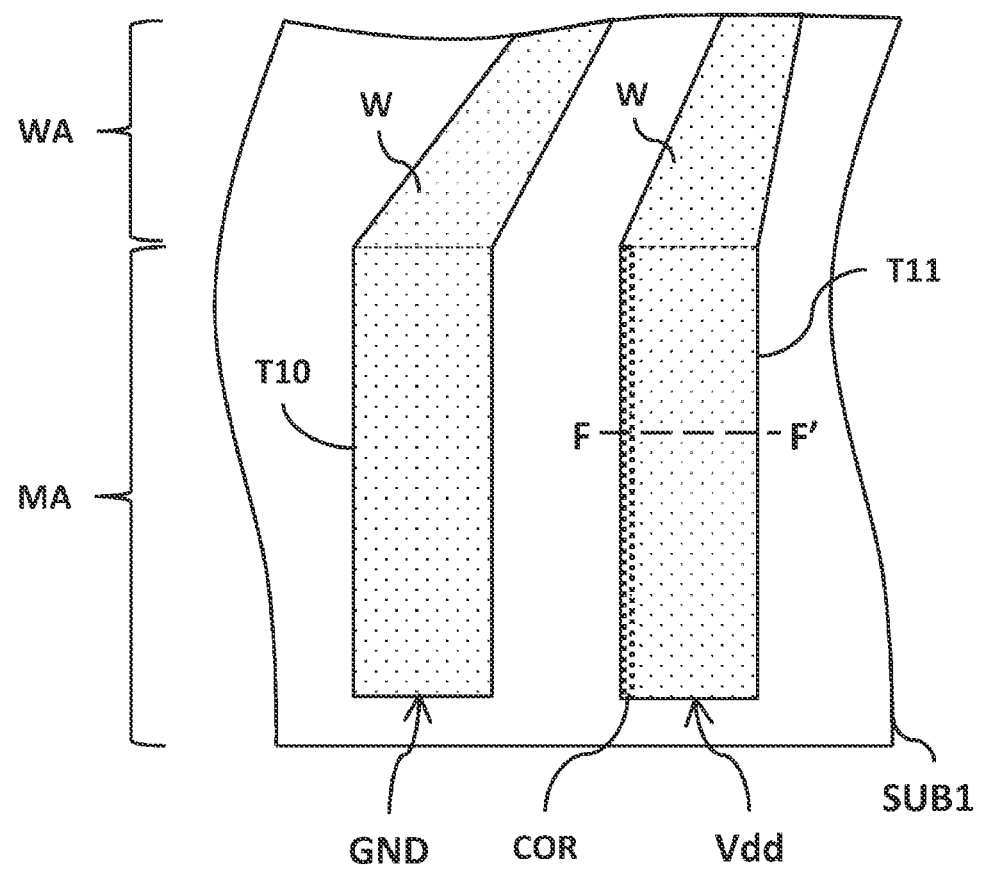
FIG. 10 is a plan view for explaining a terminal portion according to a comparative example.
Figure 11:
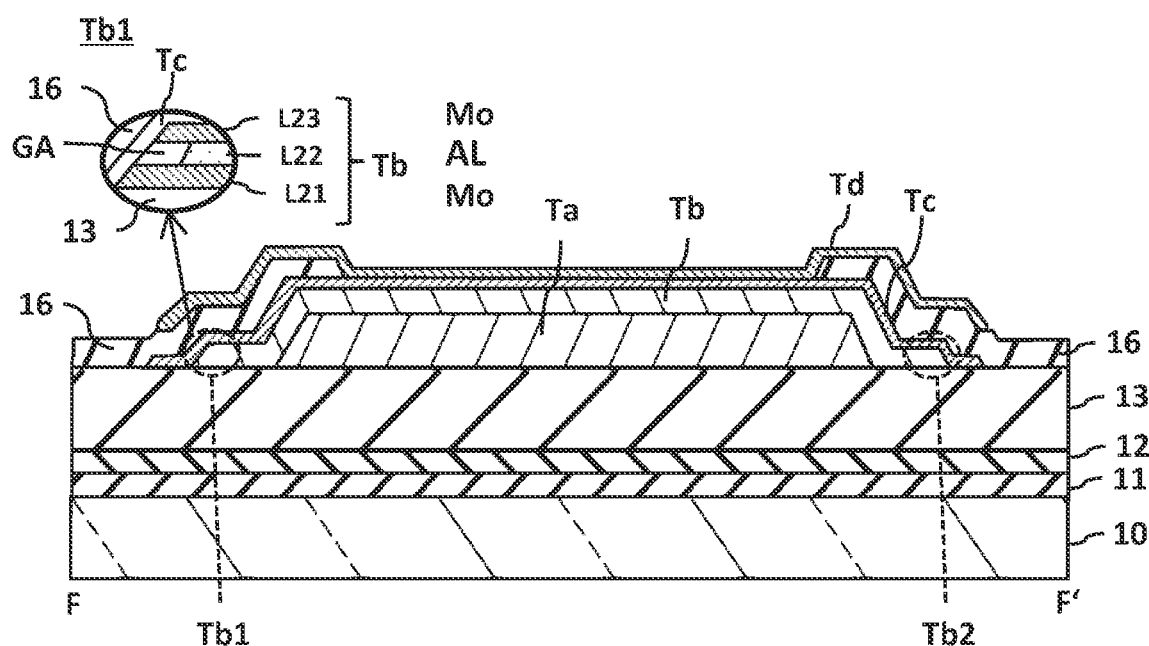
FIG. 11 is a cross-sectional view of the terminal portion taken along the line F-F' shown in FIG. 10.
Figure 12:
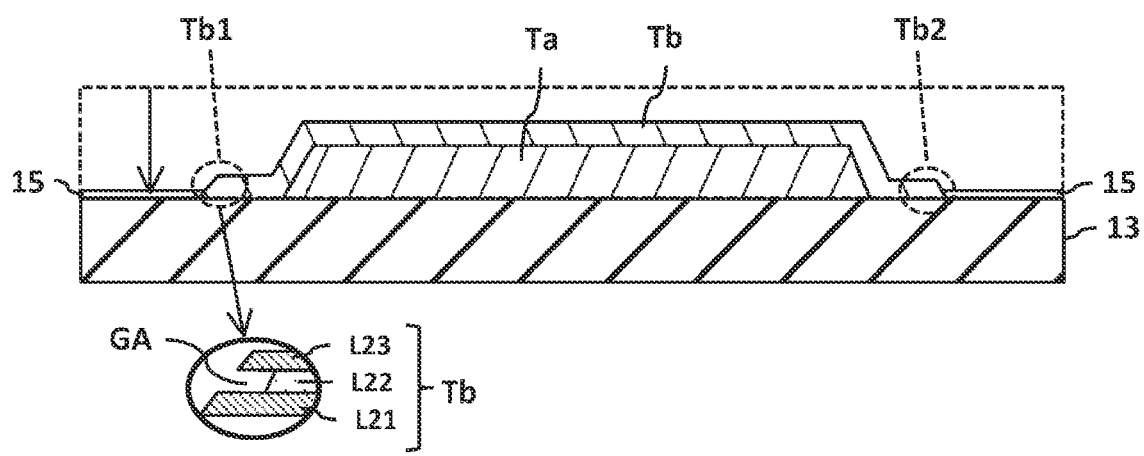
FIG. 12 is a cross-sectional view of the terminal portion according to the comparative example in the middle of manufacturing.

Next, a comparison example will be explained with reference to FIG. 10 to FIG. 12. FIG. 10 is a plan view for explaining terminal portions according to the comparison example. FIG. 11 shows a cross-sectional view of a terminal portion taken along the line F-F' shown in FIG. 10. FIG. 12 is a cross-sectional view of the terminal portion according to the comparative example in the middle of manufacturing. Here, this comparison example includes a configuration examined by the present inventors, so that this comparison example is not a publicly known art.

FIG. 10 illustratively shows two terminal portions T10 and T11 disposed adjacently to each other in the mounting unit MA. The terminal portion T10 is a power terminal portion to which, for example, a first reference voltage that is a low voltage such as the ground potential (GND) or 0 V is supplied, and the terminal portion T11 is a power terminal portion to which, for example, a second reference voltage that is a higher voltage than the first reference voltage such as an electric power potential (Vdd) or 7 V is supplied.

There are some cases where a burn-in test is conducted on the display device DSP having such terminal portions T10 and T11 under a high temperature and high humidity environment in order to evaluate and verify the reliability of the display device DSP. Here, the high temperature is 85° C. and the high humidity is 85% RH. The burn-in test is a test conducted on the display device DSP for a long time (for example, 240 hours) under the operation condition that the same electric power potentials as are used in the real operation of the display device DSP are supplied to the display device DSP. In other words, the long-time test is conducted for a long time under the condition that the terminal portion T10 is supplied with the first reference voltage and the terminal portion T11 is supplied with the second reference voltage. In such a burn-in test, there are some cases where corrosion COR is induced at the side of the terminal portion T11 facing the terminal portion T10 as shown in FIG. 10. It is conceivable that the corrosion COR of the terminal portion T11 is induced because a lateral electric field induced between the terminal portion T10 and the terminal portion T11 had an influence on moisture.

As shown in FIG. 11, the terminal portion T11 includes: a conductive layer Ta; a conductive layer Tb; a conductive layer Tc; and a conductive layer Td. Here, the insulating film 14 and the insulating film 15 are not disposed in an area where the terminal portions T (T10 and T11) are disposed in the first substrate SUB1. Therefore, the insulating film 16 is laminated on the insulating film 13. Here, although FIG. 11 illustratively shows the cross-sectional view of the terminal portion T11, other plural terminal portions T disposed in the mounting unit MA shown in FIG. 8 also have similar cross-sectional views.

The conductive layer Ta is located on the insulating film 13. The conductive layer Ta is located in the same layer as the signal line S6 shown in FIG. 5 and formed of the same material as the signal line S6.

The conductive layer Tb is laminated on the conductive layer Ta and the insulating film 13 and covers the conductive layer Ta. The conductive layer Tb is located in the same layer as the metal wiring ML6 shown in FIG. 5 and formed of the same material as the metal wiring ML6.

The conductive layer Tc is laminated on the conductive layer Tb and the insulating film 13 and covers the conductive layer Tb. The conductive layer Tc is located in the same layer as the common electrode CE shown in FIG. 5 and formed of the same material as the common electrode CE. The conductive layer Tc and the insulating film 13 are covered by the insulating film 16. The insulating film 16 includes a through bore that penetrates to the conductive layer Tc.

The conductive layer Td is located on the insulating film 16 and laminated on the conductive layer Tc that is exposed via the through bore formed in the insulating film 16. The conductive layer Td is located in the same layer as the pixel electrode PE11 shown in FIG. 6 and formed of the same material as the pixel electrode PE11.

Of the vicinities of the edges Tb1 and Tb2 of the conductive layer Tb, the vicinity of the edge Tb1 is enlarged and shown in FIG. 11. The conductive layer Tb is composed of a laminated body obtained by laminating a fourth layer L21 including molybdic (Mo), a fifth layer L22 including aluminum (Al), and a sixth layer L23 including molybdic (Mo) in this order, and it has become clear that the left edge of the fifth layer L22 is located at a position righter than the left edges of the fourth layer L21 and the sixth layer L23. In other words, it has become clear that the edge of the fifth layer L22 is in a state of being bored and there is a gap (or a concave portion) GA between the conductive layer Tc and the edge of the fifth layer L22. And it has become clear that the insulating film 16 cannot sufficiently cover the conductive layer Tc for the above reason, and moisture intrudes between the insulating film 16 and the conductive layer Tc in a burn-in test conducted under a high temperature and high humidity condition, so that the intruding moisture is influenced by an electric field, and the corrosion COR is induced. Here, another gap GA between the conductive layer Tc and the edge of the fifth layer L22 occurs at the edge Tb2 as is the case with the edge Tb1.

It has become clear that the gaps GA between the conductive layer Tc and the edge of the fifth layer L22 are formed at the time of developing the insulating film 15 in such a way that the insulating film 15 is gradually removed by a developing solution, the developing solution reaches the fifth layer L22, and the edges of the fifth layer L22 is etched and bored by the developing solution.

Configuration 1 of Terminal Portion According to Embodiment

Next, a configuration example of a terminal portion according to the embodiment will be explained with reference to FIG. 13 to FIG. 17.

Figure 13:
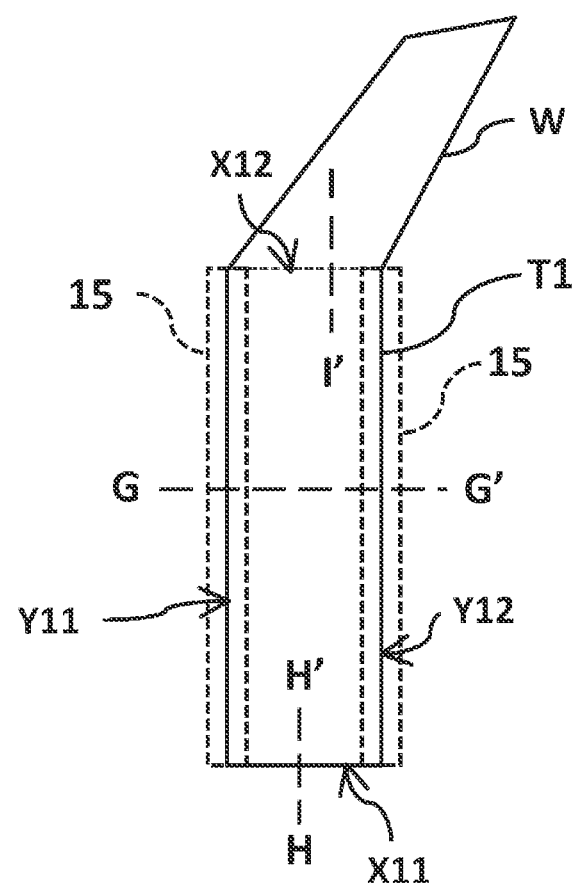
FIG. 13 is a plan view showing a terminal portion T1 according to the embodiment.
Figure 14:
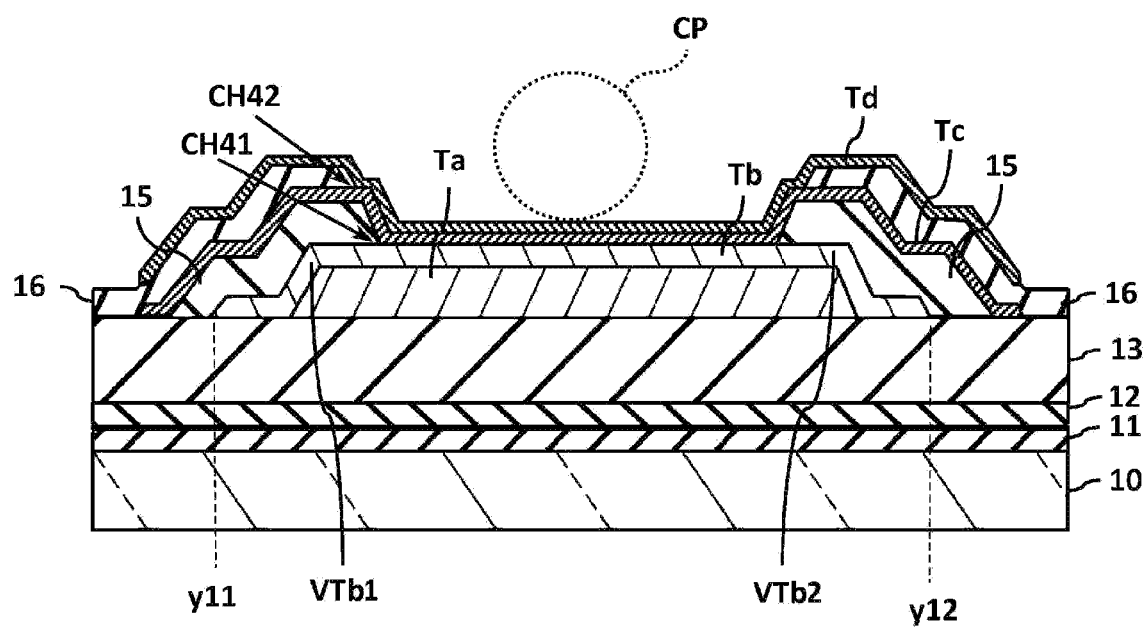
FIG. 14 is a cross-sectional view of the terminal portion T1 taken along the line G-G' shown in FIG. 13.
Figure 15:
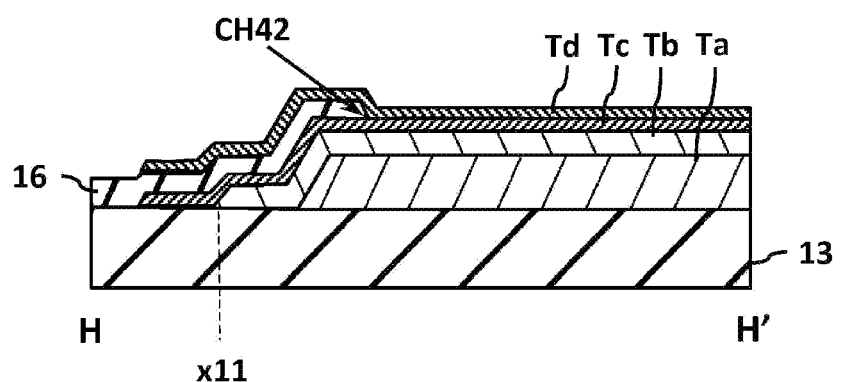
FIG. 15 is a cross-sectional view of the terminal portion T1 taken along the line H-H' shown in FIG. 13.
Figure 16:
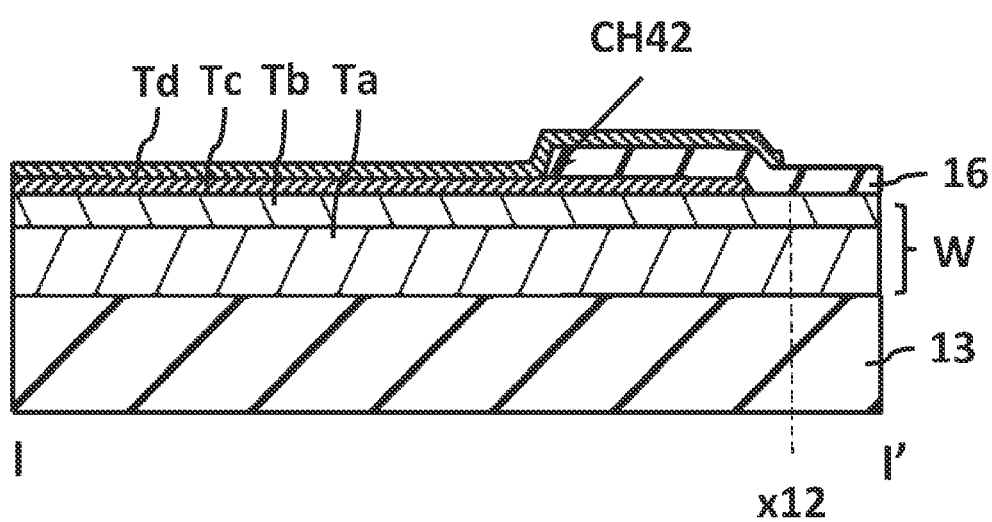
FIG. 16 is a cross-sectional view of the terminal portion T1 taken along the line I-I' shown in FIG. 13.

FIG. 13 is a plan view showing the configuration example of the terminal portion T1 according to the embodiment. FIG. 14 is a cross-sectional view of the terminal portion T1 taken along the line G-G' shown in FIG. 13. FIG. 15 is a cross-sectional view of the terminal portion T1 taken along the line H-H' shown in FIG. 13. FIG. 16 is a cross-sectional view of the terminal portion T1 taken along the line I-I' shown in FIG. 13. FIG. 17 is an enlarged view conceptually showing the terminal portion T1 shown in FIG. 13 and the conductive beads CP in the anisotropic conductive film ACF. Here, in FIG. 14, lateral dimensions are different from real dimensions and the lateral dimensions are depicted contractively. Furthermore, the insulating film 12, the insulating film 11, and the insulating substrate 10 in the first substrate SUB1 are not depicted in FIG. 15 and FIG. 16.

As shown in FIG. 13, the outer shape of the terminal portion T1 is a rectangle having a pair of long sides Y11 and Y12 and a pair of short sides X11 and X12. The peripheral portions of the terminal portion T1 along the pair of long sides Y11 and Y12 of the terminal portion T1 are covered by a pair of insulating films 15.

As shown in FIG. 14, the terminal portion T1 includes: a conductive layer Ta; a conductive layer Tb; a conductive layer Tc; and a conductive layer Td. Here, the insulating film 14 is not disposed in an area where the terminal portion T is disposed in the first substrate SUB1. Therefore, the insulating film 16 is laminated on the insulating film 13. In FIGS. 14, y11 and y12 illustratively show the positions of the long sides Y11 and Y12 respectively. In this example, the position y11 shows the vicinity of the edge of the left peripheral portion VTb1 of the conductive layer Tb, and the position y12 shows the vicinity of the edge of the right peripheral portion VTb2 of the conductive layer Tb. In other words, the peripheral portions VTb1 and VTb2 of the conductive layer Tb are areas corresponding to the long sides Y11 and Y12 respectively.

The conductive layer (first metal portion) Ta is located on the insulating film 13. The conductive layer Ta is formed of the second metal layer, located in the same layer as the signal line S6, and formed of the same material as the signal line S6. The conductive layer Tb is formed of a laminated film formed by laminating titanium, aluminum, and titanium in this order.

The conductive layer (second metal portion) Tb is formed of the third metal layer and laminated on the conductive layer Ta and the insulating film 13, and covers the whole surface (that is, the whole upper surface and the whole side surface) of the conductive layer Ta. The conductive layer Tb and the insulating film 13 are covered by the insulating film (organic insulating film) 15. The peripheral portions VTb1 and VTb2 of the conductive layer Tb along the long sides Y11 and Y12 including the side surfaces of the peripheral portions VTb1 and VTb2 of the conductive layer Tb are covered by the insulating film 15. On the peripheral portions of the conductive layer Ta along the long sides Y11 and Y12, the conductive layer Ta, the conductive layer Tb, and the insulating film 15 are laminated in this order. The insulating film 15 includes a through bore (a first through hole or a first opening) CH41 that penetrates to the conductive layer Tb. The insides of the peripheral portions VTb1 and VTb2 of the conductive layer Tb are exposed via the through bore CH41 made in the insulating film 15. The film thickness of the insulating film 15 is set to be, for example, approximately 1.5 μm. The conductive layer Tb is located in the same layer as the metal wiring ML6 shown in FIG. 5 and formed by the same material as the metal wiring ML6. In other words, the conductive layer Tb is formed of a laminated film formed by laminating molybdic, aluminum, and molybdic in this order.

The conductive layer (first transparent conductive film) Tc is laminated on the conductive layer Tb and the insulating film 13 and covers the conductive layer Tb. The conductive layer Tc is in contact with the conductive layer Tb at a position where the through bore CH41 is formed in the insulating film 15. In addition, the conductive layer Tc is in contact with the insulating film 15 at positions where the conductive layer Tc overlaps the peripheral portions VTb1 and VTb2 of the conductive layer Tb. The conductive layer Tc and the insulating film 13 are covered by the insulating film (inorganic insulating film) 16. In other words, the insulating film 16 covers the conductive layer Tc at positions where the insulating film 16 overlaps the peripheral portions VTb1 and VTb2 of the conductive layer Tb and includes a through bore (a second through hole or a second opening) CH42 that exposes the conductive layer Tc at a position where the through bore CH41 in the insulating film 15 is formed. The conductive layer Tc is located in the same layer as the common electrode CE shown in FIG. 5 and formed of the same material as the common electrode CE.

The conductive layer (second transparent conductive film) Td is located on the insulating film 16 and laminated on the conductive layer Tc exposed via the through bore CH42 formed in the insulating film 16. In other words, the conductive layer Td is in contact with the insulating film 16 at positions where the conductive layer Td overlaps the peripheral portions VTb1 and VTb2 of the conductive layer Tb and is in contact with the conductive layer Tc at a position where the through bore Ch42 is formed in the insulating film 16. The conductive layer Td is located in the same layer as the pixel electrode PE11 shown in FIG. 6 and formed of the same material as the pixel electrode PE11.

The depth of the through bore CH41 is the same as the thickness of the insulating film 15 and, for example, approximately 1.5 μm. If it is assumed that each of the diameters of the conductive beads CP in the anisotropic conductive film ACF is, for example, approximately 3.8 μm, each of the diameters of the conductive beads CP is set to be smaller or shallower than the depth of the through bore CH41 in the insulating film 15 as shown in FIG. 14.

As mentioned above, because the right peripheral portion VTb1 and the left peripheral portion VTb2 of the conductive layer Tb are covered by the pair of the insulating films 15, the bore or gap of the aluminum of the laminated film composing the conductive layer Tb, which has been described in the case of the comparative example, can be prevented from occurring. Therefore, the insulating film 16 can sufficiently cover the conductive layer Tc. As a result, even the burn-in test is conducted in the high temperature and high humidity condition, moisture can be prevented from intruding between the insulating film 16 and the conductive layer Tc, and therefore corrosion at the peripheral portions corresponding to the pair of the long sides Y11 and Y12 of the terminal portion T1 is prevented from being induced. With this, the improvement of the reliability of the terminal portion T1 can be attained.

FIG. 15 shows a cross-sectional view of the terminal portion T1 taken along the line H-H' shown in FIGS. 13, and x11 illustratively shows the position of the short side X11 of the terminal portion T1. In this example, the position x11 shows the vicinity of the left peripheral portion of the conductive layer Tb. As shown in FIG. 15, the insulating film 15 is not formed between the conductive layer Tb and the conductive layer Tc at the left peripheral portion of the conductive layer Tb unlike in the case of the configuration shown in FIG. 14. Therefore, the conductive layer Tb and the conductive layer Tc can be laminated. Because other portions shown in FIG. 15 are the same as shown in FIG. 4, explanations thereof will be omitted.

FIG. 16 shows a cross-sectional view of the terminal portion T1 taken along the line I-I' shown in FIGS. 13, and x12 illustratively shows the position of the short side X12 of the terminal portion T1. The right side of the position x12 composes the wiring portion W. At the right peripheral portion of the conductive layer Tc, the insulating film 15 is not formed between the conductive layer Tb and the conductive layer Tc unlike in the case of the configuration shown in FIG. 14. The conductive layer Ta and the conductive layer Tb extend to the right side without both conductive layers Ta and Tb being cut to compose the wiring portion W. In the vicinity of the left side of the position x12, the insulating film 16 is formed between the right peripheral portion of the conductive layer Tc and the right peripheral portion of the conductive layer Td. Furthermore, the insulating film 16 is laminated on the conductive layer Tc so as to cover the upper surface of the conductive layer Tc.

In FIG. 17, enlarged views of two terminal portions T1 and an anisotropic conductive film ACF overlapped by the two terminal portions T1 are depicted. The anisotropic conductive film ACF shows a configuration of an anisotropic conductive film including plural conductive beads CP arranged in plural lines as one of configuration examples. As mentioned above, the diameter Dcp of a conductive bead in the anisotropic conductive film ACF is, for example, 3.8 μm, and the depth of the through bore CH41 in the insulating film 15 is, for example, 1.5 μm. In addition, the length of the short side X11 of a terminal portions T1 is, for example, 16.7 μm. As described in FIG. 14, conductions between the conductive beads CP in the anisotropic conductive film ACF and the terminal portion T1 at the through bore CH41 in the insulating film 15 can securely be obtained. Furthermore, as shown in FIG. 17, if the anisotropic conductive film ACF including the conductive beads CP arranged in the plural lines is used, electric conductions between the conductive beads CP and the terminal portions T1 can be obtained in a securer manner. The conductive beads CP can be fixed or disposed in the through bore CH41 more securely in this case than in the case of the flat terminal portion T11 shown in FIG. 11. In other words, in the terminal portion T11 shown in FIG. 11, electric conductions between conductive beads CP and the terminal portion T11 are obtained via the through bore or concave portion almost composed of the step of the thickness of the insulating film 16. On the other hand, in the terminal portion T1 shown in FIG. 14, the depth of a unified through bore or concave portion composed of the through bore CH41 in the insulating film 15 and the through bore CH42 in the insulating film 16 is deeper than the depth of the through bore or concave portion in the terminal portion T11 shown in FIG. 11 by the depth of the through bore CH41 in the insulating film 15. Therefore, the conductive beads CP can be fixed or disposed in the unified through bore or concave portion more securely in the terminal portion T1 shown in FIG. 14 than in the terminal portion T11 shown in FIG. 11, so that better electric conductions can be obtained.

Configuration 2 of Terminal Portion According to Embodiment

Figure 18:
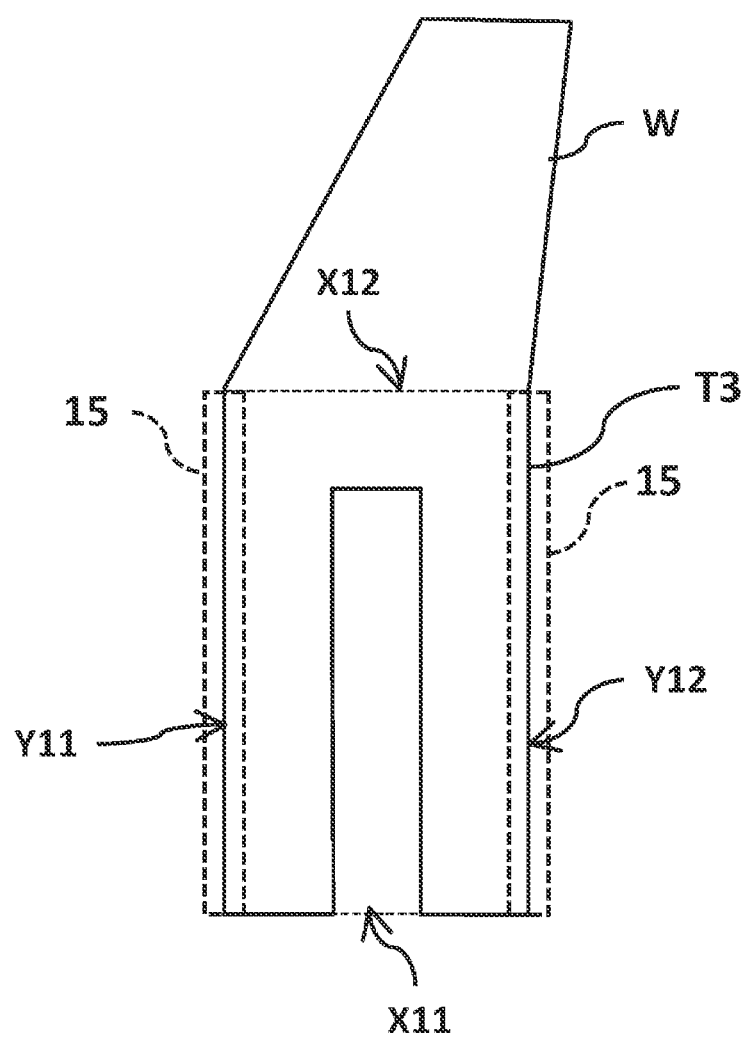
FIG. 18 is a plan view of a terminal portion T3 according to the embodiment.

FIG. 18 is a plan view of a terminal portion T3 according to the embodiment. As described in FIG. 8, the terminal portion T3 has an approximately U-shaped outer shape, and for example, the terminal portion T3 can be used as a terminal to which electric power is supplied. Although the terminal portion T3 has the approximately U-shaped outer shape, as explained in FIG. 13, the shape of the terminal portion T3 can be considered to be a rectangle having a pair of long sides Y11 and T12 and a pair of short sides X11 and X12. Therefore, it will be all right if a pair of insulating films 15 is formed at the peripheral portions of the terminal portion T3 along the long sides Y11 and Y12 of the terminal portion T3 as explained in FIG. 13. In other words, in the burn-in test under the high temperature and high humidity environment, the peripheral portions of the terminal portion T3 along the pair of the long sides Y11 and Y12 are areas to which attention should be paid regarding the relations with terminal portions disposed adjacently to the left side and the right side of the terminal portion T3. Therefore, forming the pair of insulating films 15 at the peripheral portions of the terminal portions T3 along the pair of the long sides Y11 and Y12 of the terminal portion T3 makes it possible to improve the reliability of the approximately U-shaped terminal portion T3.

Although the above description is made about the approximately U-shaped terminal portion T3, in the case where an approximately E-type terminal portion or a comb-type terminal portion is present in the mounting unit MA, a technological idea similar to the above can also be applied to the approximately E-type terminal portion or the comb-type terminal portion.

Here, as for the terminal portion T2 that is explained in FIG. 8 and set to be electrically floating, whether or not a pair of insulating film 15 is formed along a pair of the long sides of the terminal portion T2 does not make any difference. This is because it is considered that there will be no special trouble with a burn-in test of the terminal portion T2 under a high temperature and high humidity environment owing to the fact that the terminal portion T2 is electrically floating.

It is also possible that the insulating film 15 is formed along the long side Y11 or Y12 of one terminal portion having a higher potential of two terminal portions that are adjacent to each other and between which a lateral electric field is induced in the burn-in test under the high temperature and high humidity environment.

MODIFICATION EXAMPLES

Hereinafter some modification examples will be explained.

Modification Example 1

Figure 19:
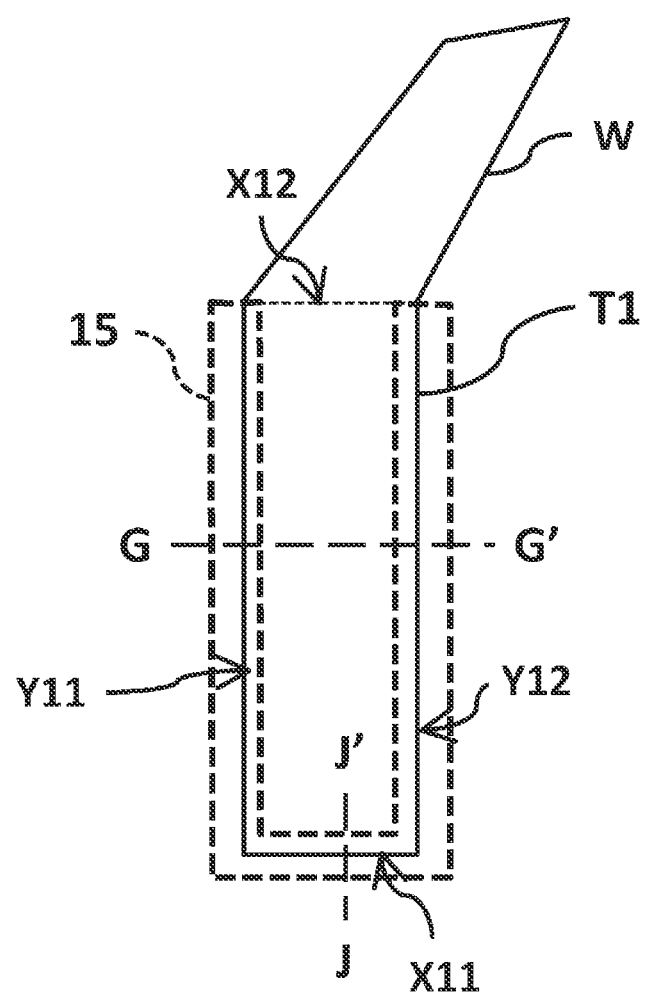
FIG. 19 is a plan view of a terminal portion T1 according to a modification 1.
Figure 20:
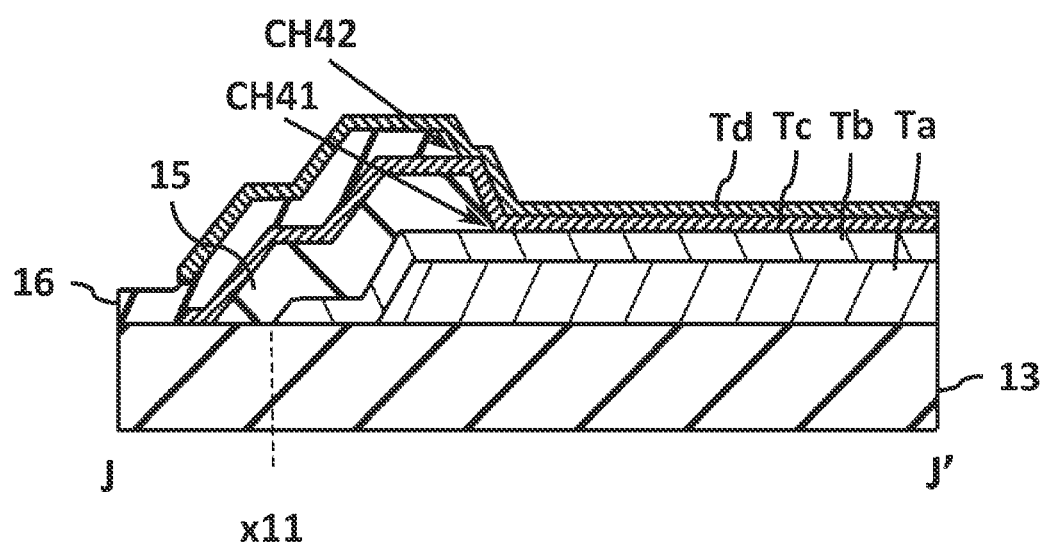
FIG. 20 is a cross-sectional view of the terminal portion T1 taken along the line J-J' shown in FIG. 19.

FIG. 19 is a plan view of a terminal portion T1 according to a modification example 1. FIG. 20 is a cross-sectional view of the terminal portion T1 taken along the line J-J' shown in FIG. 19. The termination portion T1 shown in FIG. 19 is different from the termination portion T1 shown in FIG. 13 in that an insulating film 15 is formed at the peripheral portion of the terminal portion T1 along the short side X11 of the terminal portion T1 shown in FIG. 19. In other word, in FIG. 19, an approximately U-shaped insulating film 15 is formed at the peripheral portion of the terminal portion T1 along a pair of the long sides Y11 and Y12 and the short side X11 of the terminal portion T1.

As shown in FIG. 20, in a cross-sectional view of the terminal portion T1 taken along the line J-J' shown in FIG. 19, the insulating film 15 is formed so as to cover the peripheral portion of a conductive layer Tb similarly to the explanation made in FIG. 14. The constitution of the cross-sectional view of the terminal portion T1 taken along the line J-J' is the same as the constitution of the cross-sectional view shown in FIG. 14, and therefore redundant explanation thereof will be omitted.

Modification Example 2

Figure 21:
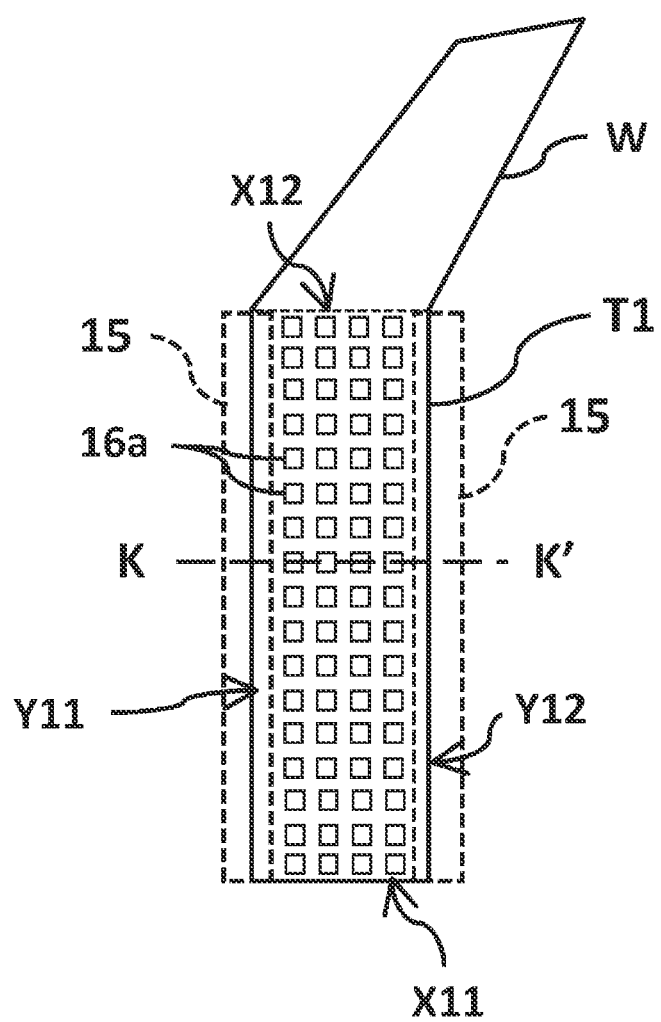
FIG. 21 is a plan view of a terminal portion T1 according to a modification 2.
Figure 22:
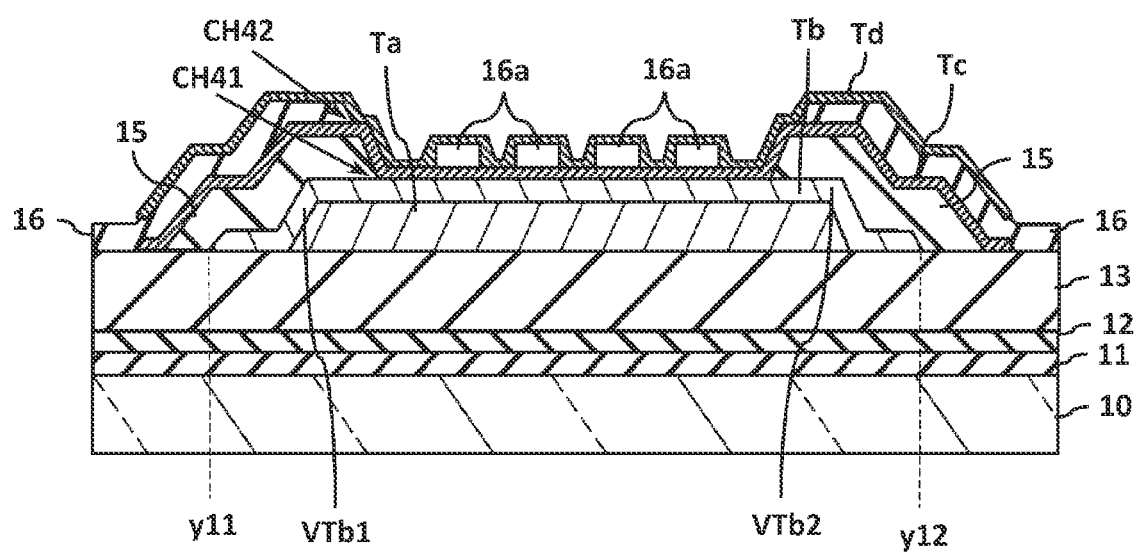
FIG. 22 is a cross-sectional view of the terminal portion T1 taken along the line K-K' shown in FIG. 21.

FIG. 21 is a plan view of a terminal portion T1 according to a modification example 2. FIG. 22 is a cross-sectional view of the terminal portion T1 taken along the line K-K' shown in FIG. 21. The termination portion T1 shown in FIG. 21 is different from the termination portion T1 shown in FIG. 13 in that plural rectangle-shaped insulating film 16a are formed between a pair of the long sides Y11 and Y12 of the terminal portion T1 shown in FIG. 21 in a planar view. In other word, the plural insulating films 16a are formed between a conductive layer Tc and a conductive layer Td in an area where the conductive layer Tb and a conductive layer Tc are in contact with each other as shown in FIG. 22.

By forming the plural insulating films 16a on the conductive layer Tc in the area where the conductive layer Tb and a conductive layer Tc are in contact with each other, the surface of the conductive layer Td in the area where the conductive layer Tb and a conductive layer Tc are in contact with each other includes plural step portions owing an influence exerted by the film thicknesses of the plural insulating films 16a. The plural steps formed on the surface of the conductive layer Td play a role of improving electric connections between the conductive beads CP in an anisotropic conductive film ACF and the conductive layer Td of the terminal portion T1.

Although four insulating films 16a are depicted in FIG. 22 as a configuration example, it is all right if there is one insulating film 16a or more. In addition, although it is described that the shapes of the plural insulating films 16a in a planar view in FIG. 21 are rectangular, the shapes of the plural insulating films 16a are not limited to rectangles. The shapes of the insulating films 16a in a planar view can be changed to circles, rectangles, ovals or combinations thereof. In other words, it is all right if steps are formed in the surface of the conductive layer Td. The number, the planar shapes, and the like of the insulating films 16a can be modified variously under a prerequisite that an electric connection between the conductive layer Tc and the conductive layer Td is securely attained.

The plural insulating films 16a can be formed by selectively patterning the insulating film 16. For example, the plural insulating films 16a can be formed in parallel in a process in which a through bore CH42 is formed in an insulating film 16. This process makes it possible to form the plural insulating films 16a without increasing the relevant manufacturing cost. Although the description to the effect that the plural insulating films 16a are formed using the insulating film 16 has been made so far, a method for forming the plural insulating films 16a is not limited to this method. It is also conceivable that the plural insulating films 16a are formed using an insulating film other than the insulating film 16.

Furthermore, the mounting area MA can be perceived as a terminal area MA, and although the terminal portion T connecting to the flexible wiring substrate 1 has been explained in detail in this example, if the terminal portion T and a driver IC are configured in such a way that the terminal portion T is formed in the mounting area MA and the driver IC is connected to the first substrate SUB, the terminal portion T may be used for connecting to the driver IC.

In addition, the structure of the terminal portion T is made in such a way that the terminal portion T can be not only used for connecting to the flexible wiring substrate 1 but also used as an inspection pad and the like, for example.

Furthermore, the organic insulating film 15 of the terminal area MA is corresponding to the organic insulating film 15 of the display portion DA, and the pattering of the organic insulating film 15 of the terminal area MA is executed at the same time as the patterning of the organic insulating film 15 of the display portion DA. In other words, the organic insulating film 15 of the terminal area MA is removed except for the peripheral portion of the conductive layer Tb (the third metal portion).

In addition, the insulating film 15 can be formed of not only an organic material but also an inorganic material. In the case where the insulating film 15 is formed of an inorganic material, it is preferable that the thickness of the insulating film 15 is as large (thick) as possible when flatness between the insulating film 15 and the third metal wiring is taken into consideration. However, it is difficult to form an inorganic insulating film having its film thickness almost equal to the film thickness of an organic insulating film (to form the film thickness of the inorganic insulating film equivalent to the film thickness of the organic insulating film). Therefore, if the insulating film 15 is formed of an inorganic material, it is conceivable that the insulating film 15 is formed of plural layers each of which is composed of an inorganic film.

As described above, a display device capable of attaining the improvement of the reliability of the terminal portion can be provided according to the embodiment.

It is conceivable that all display devices that can be implemented by those skilled in the art through appropriate design modifications on the basis of the above-described display device according to the embodiment of the present invention fall within the scope of the present invention as long as those display devices include the gist of the present invention.

It should be understood that, if various alternation examples and modification examples are easily conceived by those skilled in the art within the idea of the present invention, those alternation examples and modification examples also fall within the scope of the present invention. For example, devices obtained in the case where those skilled in the art appropriately add components to the above-described embodiment, delete components from the above-described embodiment, add processes to original processes for the above-described embodiment, omit processes from the original processes, or alter conditions for implementing the above-described embodiment fall within the scope of the present invention as long as the devices do not deviate from the gist of the present invention.

In addition, it should be obviously understood that other operational effects, which are brought about by this embodiment, clear from the descriptions of the present specification, and can be accordingly conceived by those skilled in the art, are brought about by the present invention.

Various inventions can be achieved by appropriately combining plural components disclosed in the above-described embodiment. For example, a new invention will be achieved by deleting some components from all the components included in the embodiment. Alternatively, another new invention will be achieved by appropriately combining components from the above-described embodiment and modifications 1 and 2.

What is claimed is:

1. A display device comprising:
a first substrate including plural pixels in a display portion and a terminal portion outside of the display portion; and
a flexible printed circuit substrate connected to the terminal portion,
wherein
the display portion includes: an insulating substrate; a first insulating film; a second insulating film on the first insulating film; a third insulating film on the second insulating film; a fourth insulating film on the third insulating film; an orientation film on the fourth insulating film; a gate wiring formed of a first metal layer between the insulating substrate and the first insulating film; a signal line formed of a second metal layer between the first insulating film and the second insulating film; a metal wiring formed of a third metal layer between the second insulating film and the third insulating film; a first transparent electrode formed of a first transparent conductive film between the third insulating film and the fourth insulating film; and a second transparent electrode formed of a second transparent conductive film between the fourth insulating film and the orientation film, the terminal portion includes: a first metal portion formed of the second metal layer; and a second metal portion that is laminated on the first metal portion and formed of the third metal layer, a peripheral portion of the second metal portion is covered by a fifth insulating film, and the inside of the peripheral portion of the second metal portion is exposed via a first through hole formed in the fifth insulating film, the fifth insulating film is formed same material as the third insulating film, the terminal portion further includes a first conductive layer formed of the first transparent conductive film, the first conductive layer is in contact with the second metal portion at a position where the first through hole is formed, and the first conductive layer is in contact with the fifth insulating film at a position where the first conductive layer overlaps the peripheral portion of the second metal portion.

2. The display device of claim 1, wherein the fifth insulating film is an organic insulating film.

3. The display device of claim 1, wherein the fifth insulating film is an inorganic insulating film.

4. The display device of claim 1, wherein a wiring is pulled out from the first metal portion of the terminal portion, and the wiring is formed of the second metal layer.

5. The display device of claim 1, wherein a wiring is pulled out from the second metal portion of the terminal portion, and the wiring is formed of the third metal layer.

6. The display device of claim 1, wherein a wiring is pulled out from the terminal portion, and the wiring has a laminated structure of the second metal layer and the third metal layer.

7. The display device of claim 1, wherein the terminal portion further includes a sixth insulating film and a second conductive layer, the sixth insulating film is formed of same material as the fourth insulating film, the second conductive layer is formed of same material as the second transparent conductive film, the sixth insulating film covers the first conductive layer at a position where the sixth insulating film overlaps the peripheral portion of the second metal layer, the sixth insulating film has a second through hole via which the first conductive layer exposed at a position where the first though hole is formed, the second conductive layer is in contact with the sixth insulating film at a position where the second conductive layer overlaps the peripheral portion of the second metal portion, and the second conductive layer is in contact with the first conductive layer at a position where the second through hole is formed.

8. The display device of claim 7, wherein the second metal layer is a laminated film made of molybdenum, aluminum, and molybdenum, and the first metal layer is a laminated film made of titanium, aluminum, and titanium.

9. The display device of claim 1, wherein a shape of the terminal portion is a rectangle having a pair of long sides and a pair of short sides, and the peripheral portion of the second metal portion covered by the fifth insulating film is an area corresponding to the pair of long sides.

10. The display device of claim 9, wherein the fifth insulating film further covers the peripheral portion of the second metal portion at an area corresponding to one of the pair of short sides of the terminal portion.

* * * * *